(12) United States Patent
Ishikawa et al.

(10) Patent No.: US 12,283,006 B2
(45) Date of Patent: Apr. 22, 2025

(54) INFORMATION PROCESSING DEVICE AND INFORMATION PROCESSING METHOD

(71) Applicant: SONY GROUP CORPORATION, Tokyo (JP)

(72) Inventors: Tomoya Ishikawa, Tokyo (JP); Gaku Narita, Tokyo (JP); Tomu Tahara, Tokyo (JP); Takashi Seno, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 204 days.

(21) Appl. No.: 17/911,316

(22) PCT Filed: Feb. 10, 2021

(86) PCT No.: PCT/JP2021/004935
§ 371 (c)(1),
(2) Date: Sep. 13, 2022

(87) PCT Pub. No.: WO2021/192686
PCT Pub. Date: Sep. 30, 2021

(65) Prior Publication Data
US 2023/0112368 A1  Apr. 13, 2023

(30) Foreign Application Priority Data
Mar. 23, 2020  (JP) ................................. 2020-051779

(51) Int. Cl.
*G06T 19/00* (2011.01)
*G06F 3/0484* (2022.01)

(52) U.S. Cl.
CPC .......... *G06T 19/006* (2013.01); *G06F 3/0484* (2013.01)

(58) Field of Classification Search
CPC ............................ G06T 19/006; G06F 3/0484
(Continued)

(56) References Cited

U.S. PATENT DOCUMENTS 7,768,534 B2 *   8/2010  Pentenrieder ......... G06T 19/006
                                                  345/619
2014/0347391 A1 *  11/2014  Keane .................... G06F 3/0487
                                                  345/633
(Continued)

FOREIGN PATENT DOCUMENTS

| JP | 2001-273520 A | 10/2001 |
| JP | 2006-072668 A | 3/2006 |
| JP | 2016-516241 A | 6/2016 |

OTHER PUBLICATIONS

International Search Report and Written Opinion of PCT Application No. PCT/JP2021/004935, issued on May 11, 2021, 09 pages of ISRWO.
(Continued)

*Primary Examiner* — Thomas J Lett
(74) *Attorney, Agent, or Firm* — CHIP LAW GROUP

(57) ABSTRACT

A content display device that functions as an information processing device includes an acquisition unit, a determination unit, and a display control unit. The acquisition unit acquires template data defining relative relationships between a first real object, a second real object, and a virtual object. The determination unit determines the relative relationship between the first real object and the second real object from three-dimensional data of a real space detected by the sensor. The display control unit controls the display device to arrange the virtual object on or near the first real object so as to face the second real object, based on the relative relationships and the template data.

13 Claims, 19 Drawing Sheets

(58) Field of Classification Search
USPC .......................................................... 345/419
See application file for complete search history.

(56) References Cited

U.S. PATENT DOCUMENTS

| | | | | |
|---|---|---|---|---|
| 2015/0302665 | A1* | 10/2015 | Miller | G06F 3/016 345/419 |
| 2019/0197785 | A1* | 6/2019 | Tate-Gans | G06T 19/006 |
| 2021/0042992 | A1* | 2/2021 | Newman | G06T 19/006 |

OTHER PUBLICATIONS

Takeshima, et al., "Integration and Visualization Method of Virtual Space by Scene Graph with Semantic Information", Proceedings of the 14th Data Engineering Workshop, May 16, 2003.

Narita, et al., "PanopticFusion: Online Volumetric Semantic Mapping at the Level of Stuff and Things", IEEE/RSJ, International Conference on Intelligent Robots and Systems, Sep. 9, 2019, 8 pages.

Grinvald, et al., "Volumetric Instance-Aware Semantic Mapping and 3D Object Discovery", IEEE, Robotics and Automation Letters, Jul. 10, 2019, 8 pages.

Wang, et al., "Normalized Object Coordinate Space for Category-Level 6D Object Pose and Size Estimation", IEEE, Conference on Computer Vision and Pattern Recognition, Jun. 23, 2019, 12 pages.

Xu, et al., "Scene Graph Generation by Iterative Message Passing", IEEE, Conference on Computer Vision and Pattern Recognition, Apr. 12, 2017, 10 pages.

Savva, et al., "PiGraphs: Learning Interaction Snapshots from Observations", ACM Transactions on Graphics, Jul. 24-28, 2016, 12 pages.

* cited by examiner

FIG.5

| | PAST RELATIONSHIP LABEL | CURRENT RELATIONSHIP LABEL | FUTURE RELATIONSHIP LABEL | RELATIONSHIP ESTABLISHMENT CONDITIONS |
|---|---|---|---|---|
| PHYSICAL NORMS | | sitting on | | THERE IS NO OBSTACLE ON SEAT SURFACE |
| | | talking to | | CONVERSATION PARTNER IS WITHIN 2 m |
| SOCIAL NORM | | sitting on | | NOT CHAIR ON WHICH PERSON IS ALREADY SITTING |
| TEMPORAL NORMS | sitting on | sitting on | | 10 SECONDS OR MORE ELAPSED SINCE SITTING DOWN ONCE |
| | any | sitting on | | ABLE TO SIT WITHIN 5 SECONDS |
| | | sitting on | talking to | WHEN SCENE IS SWITCHED TO NEXT SCENE GRAPH, CONVERSATION IS POSSIBLE |
| | | sitting on | holding | WHEN SCENE IS SWITCHED TO NEXT SCENE GRAPH, TARGET OBJECT IS IN POSITION WHERE SAME CAN BE HELD |

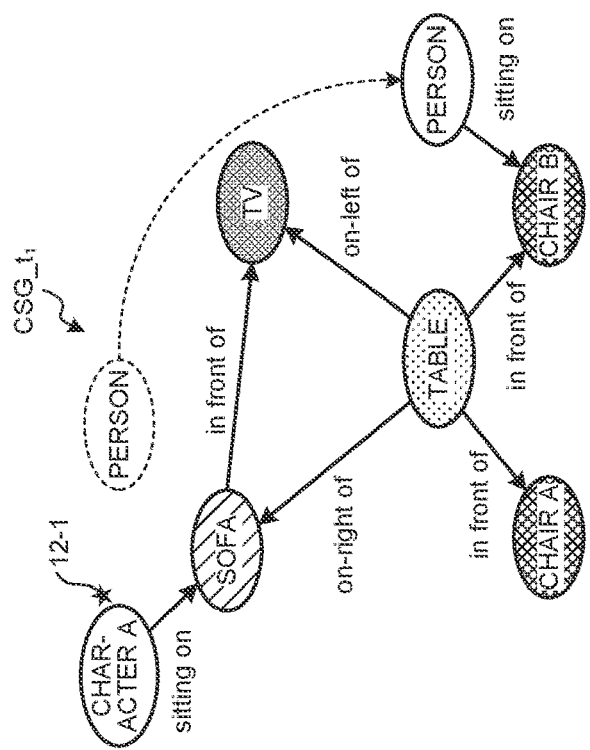
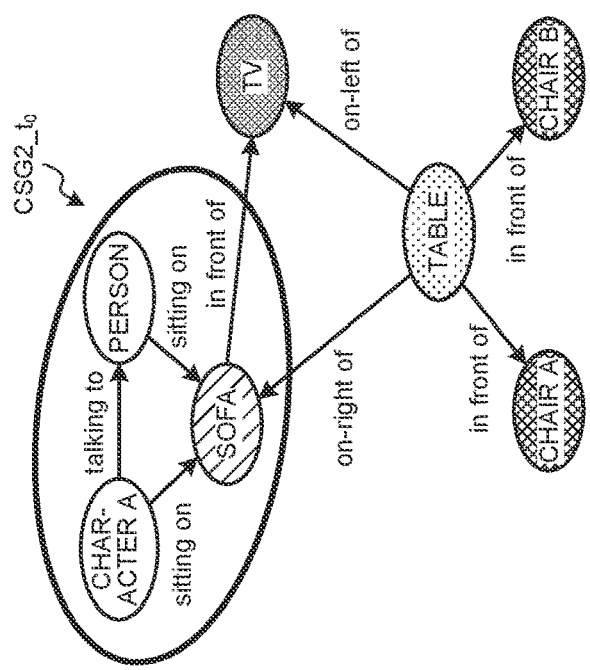
FIG.12

FIG.13
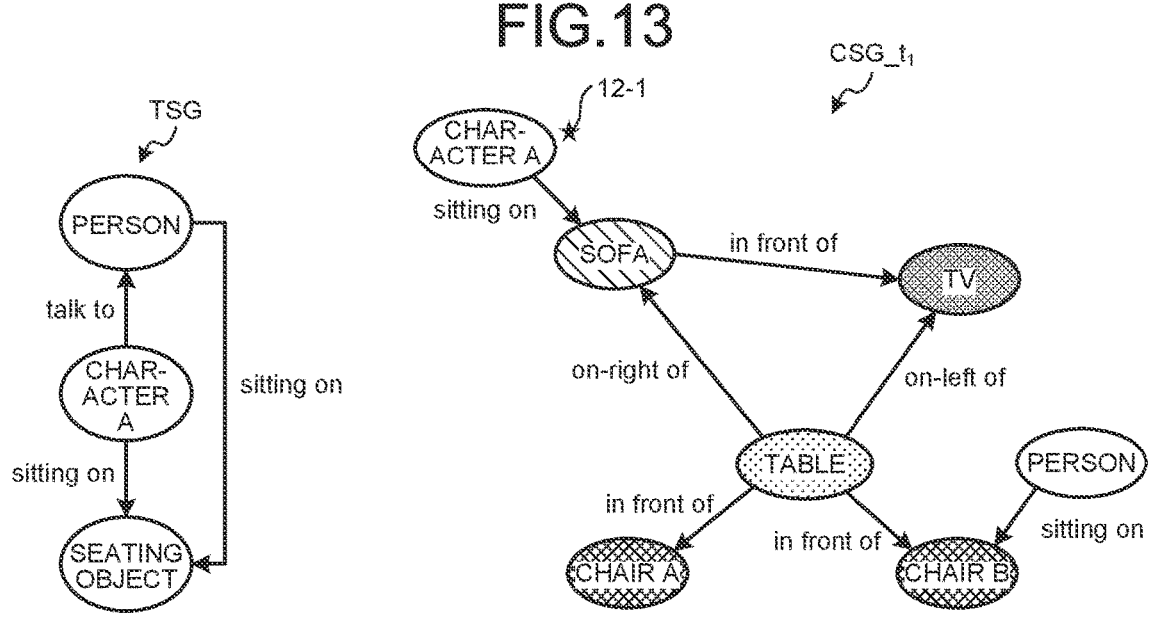
| ARRANGEMENT | SUBJECT | RELATIONSHIP LABEL | OBJECT |
|---|---|---|---|
| (1) | CHARACTER A | sitting on | SOFA |
| (2) | CHARACTER A | sitting on | CHAIR A |
| (3) | CHARACTER A | sitting on | CHAIR B |
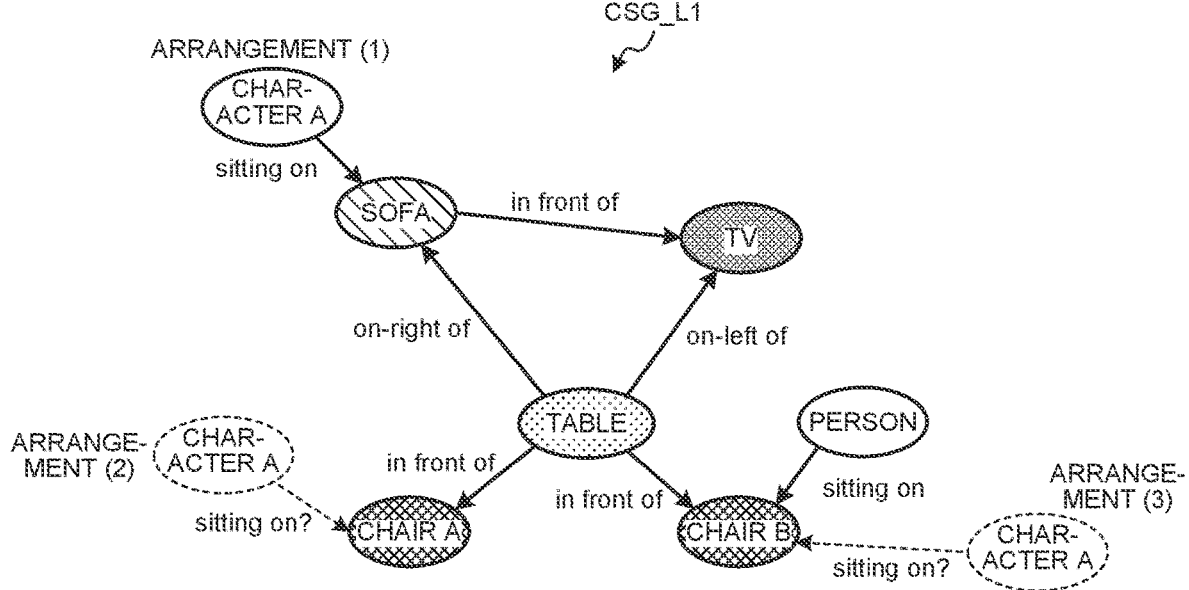

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2021/004935 filed on Feb. 10, 2021, which claims priority benefit of Japanese Patent Application No. JP 2020-051779 filed in the Japan Patent Office on Mar. 23, 2020. Each of the above-referenced applications is hereby incorporated herein by reference in its entirety.

FIELD

The present disclosure relates to an information processing device and an information processing method.

BACKGROUND

Conventionally, with augmented reality (AR) technology, in an augmented reality space perceived by a user, a real object and one or more pieces of virtual digital content are provided to the user in a merged state as if the real object and the one or more pieces of virtual digital content coexist. Such AR technology is used in a wide variety of applications such as industrial design, medical care, and entertainment.

CITATION LIST

Patent Literature

Patent Literature 1: Japanese Patent Publication No. 2016-516241.

SUMMARY

Technical Problem

In the case of the aforementioned AR technology, there is the problem of how virtual content is to be naturally fused with real space.

Therefore, the present disclosure proposes an information processing device and an information processing method that are capable of realizing content arrangement corresponding to a spatial context of a real space.

Solution to Problem

To solve the above problem, an information processing device that provides a service that requires an identity verification process according to an embodiment of the present disclosure includes: an information processing device, comprising: an acquisition unit that acquires template data defining relative relationships between a first real object, a second real object, and a virtual object; a determination unit that determines a relative relationship between the first real object and the second real object from three-dimensional data of a real space detected by a sensor; and a display control unit that controls a display device to arrange the virtual object on or near the first real object so as to face the second real object, based on the relative relationships and the template data.

BRIEF DESCRIPTION OF DRAWINGS

FIG. 5 is a diagram illustrating an example of relationship conditions.

FIG. 12 is a diagram illustrating a comparative example of scene graphs at different times.

FIG. 13 is a diagram illustrating an example of positional relationship candidates with which AR content can be realized.

DESCRIPTION OF EMBODIMENTS

Embodiments of the present disclosure will be described in detail hereinbelow based on the drawings. Note that, in each of the embodiments hereinbelow, the same reference signs are assigned to the same parts, and hence duplicate descriptions thereof are sometimes omitted. Furthermore, the present disclosure relates to various XR technologies such as AR, VR, and MR. In the following embodiments, in particular, an information processing method will be described in which real space (a real space) is recognized and the real space is naturally fused with virtual objects (AR content), the real space and the virtual object being provided to a user.

Figure 1:
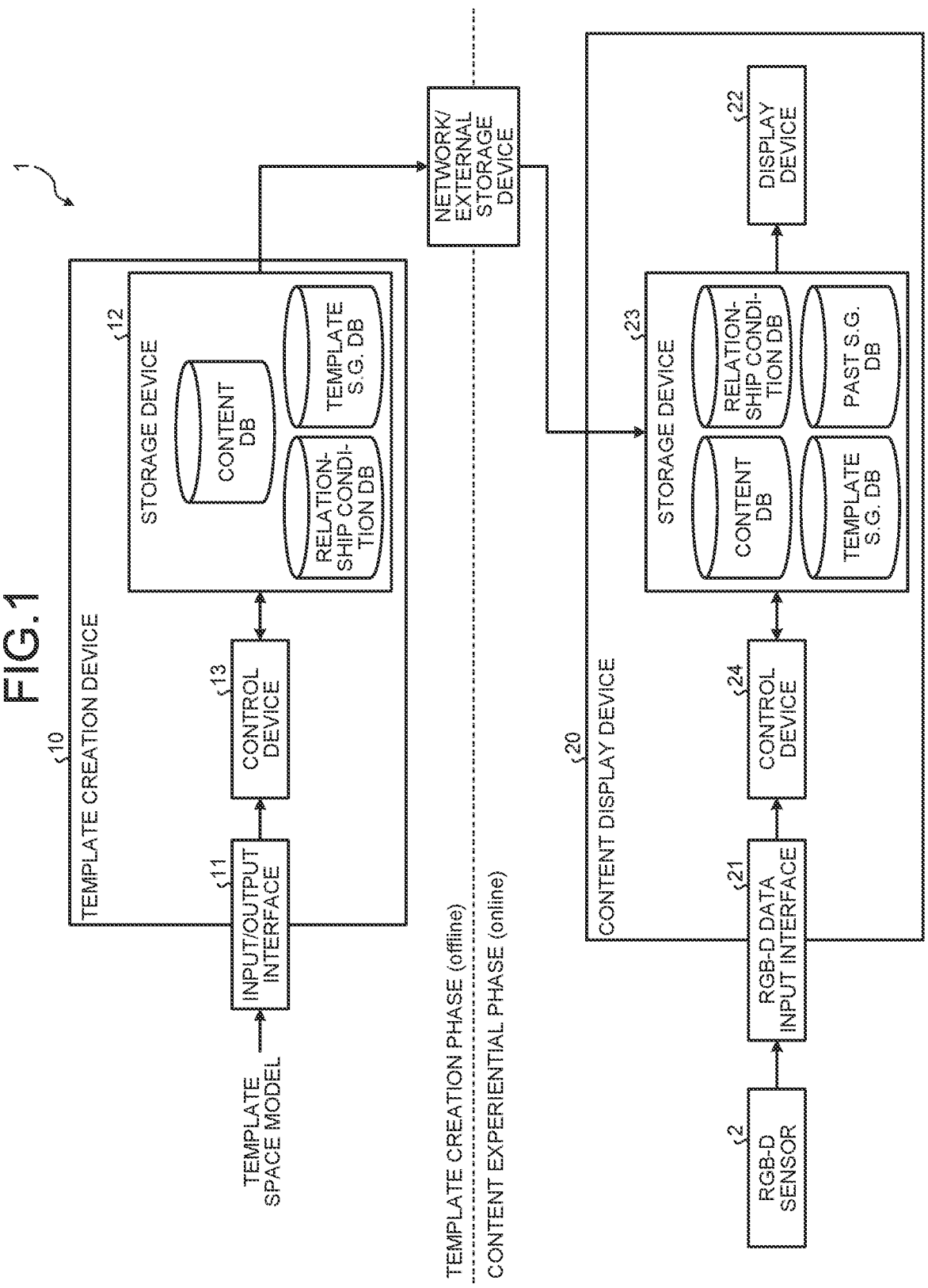
FIG. 1 is a diagram illustrating a configuration example of an information processing system according to an embodiment.

Furthermore, the present disclosure will be described according to the item order illustrated hereinbelow:
1. System configuration example
2. Function configuration example
   2-1. Function configuration of template creation device
   2-2. Function configuration of content display device
   2-3. Relationships between functions
3. Processing procedure example
   3-1. Processing procedure of template creation device
   3-2. Processing procedure of content display device
4. Other
5. Conclusion 1. System Configuration Example FIG. 1 is a diagram illustrating a configuration example of an information processing system according to an embodiment. As illustrated in FIG. 1, an information processing system 1 according to the embodiment includes an RGB-D sensor 2, a template creation device 10, and a content display device 20. The template creation device 10 and the content display device 20 are capable of transmitting and receiving various information or exchanging various information via a network or an external storage device.

The RGB-D sensor 2 measures a real space and acquires three-dimensional data that includes an RGB image and depth data. The RGB-D sensor 2 can be realized by, for example, a combination of an RGB-D camera or an RGB camera and a depth sensor, or a sensor such as LiDAR. The RGB-D sensor 2 functions as a sensor that detects three-dimensional data of the real space.

The template creation device 10 is an information processing device that executes, in an offline state, various processing relating to a template creation phase, for example, and can be realized by a personal computer (PC) or the like, for example.

As illustrated in FIG. 1, the template creation device 10 includes an input/output interface 11, a storage device 12, and a control device 13.

The input/output interface 11 acquires a template space model and inputs the template space model to the control device 13. The template space model is a three-dimensional space model for the content creator to consider how to arrange the AR content with respect to the real space.

The storage device 12 stores data and the like used for various processing relating to the template creation phase. The storage device 12 is realized by, for example, a storage device capable of reading and writing data, such as a DRAM, an SRAM, a flash memory, or a hard disk. The storage device 12 includes, for example, a content DB, a relationship condition DB, a template S.G. (scene graph) DB, or the like, which will be described subsequently.

The control device 13 is a controller that executes various processing of the template creation device 10. The controller is realized by, for example, a processor such as a central processing unit (CPU) or a micro processing unit (MPU). For example, the processor executes various programs stored in a storage device inside the template creation device 10 by using a random access memory (RAM) or the like as a work area, thereby implementing various processing relating to a template creation phase, which will be described subsequently. Note that the controller may also be realized by an integrated circuit such as an application specific integrated circuit (ASIC) or a field programmable gate array (FPGA). Any of the CPU, the MPU, the ASIC, and the FPGA can be regarded as a controller.

The content display device 20 is an information processing device that executes various processing relating to the experiential phase of AR content in an online state. The content display device 20 can be realized by, for example, a transmission-type or video through-type head mounted display (HMD), a wearable terminal such as a smartphone, a laptop-type personal computer (PC), or the like.

As illustrated in FIG. 1, the content display device 20 includes an RGB-D data input interface 21, a display device 22, a storage device 23, and a control device 24.

The RGB-D data input interface 21 acquires RGB-D data that is three-dimensional data of the real space from the RGB-D sensor 2, and inputs the RGB-D data to the control device 24.

The display device 22 displays various information such as AR content.

The storage device 23 stores data and the like used for various processing relating to the experiential phase of the AR content. The storage device 23 is realized by, for example, a storage device capable of reading and writing data, such as a DRAM, an SRAM, a flash memory, or a hard disk. The storage device 23 includes, for example, a content DB, a relationship condition DB, a template S.G. (scene graph) DB, and a past (template) S.G.DB, which will be described subsequently.

The control device 24 is a controller that executes various processing of the content display device 20. The controller is realized by, for example, a processor such as a central processing unit (CPU) or a micro processing unit (MPU). For example, the processor executes various programs stored in a storage device inside the content display device 20 by using a random access memory (RAM) or the like as a work area, thereby implementing various processing relating to the experiential phase of the AR content, which will be described subsequently. Note that the controller may also be realized by an integrated circuit such as an application specific integrated circuit (ASIC) or a field programmable gate array (FPGA). Any of the CPU, the MPU, the ASIC, and the FPGA can be regarded as a controller.

A content creator performs AR content creation by imaging a scene to be realized, and operating the template creation device 10 so as to arrange content according to the image. The video data creation of the AR content is performed so as to reflect the intention of the content creator and the scene image as far as possible. In the creation of AR content, realizing content mapping so as to retain the intention of the content creator or the scene image even if the spatial context (a shape, a relationship, or the like, of a space) changes is problematic. Therefore, as described hereinbelow, in an embodiment of the present disclosure, a template scene graph that defines a scene image which is to be realized is generated, and content mapping that corresponds to the spatial context and to changes in the spatial context is executed based on the template scene graph. Thus, even if the spatial context (the shape, relationship, or the like, of the space) changes, it is possible to realize video data creation of the AR content that is close to the scene image of the content creator and that has the same meaning as the scene.

2. Function Configuration Example

Figure 2:
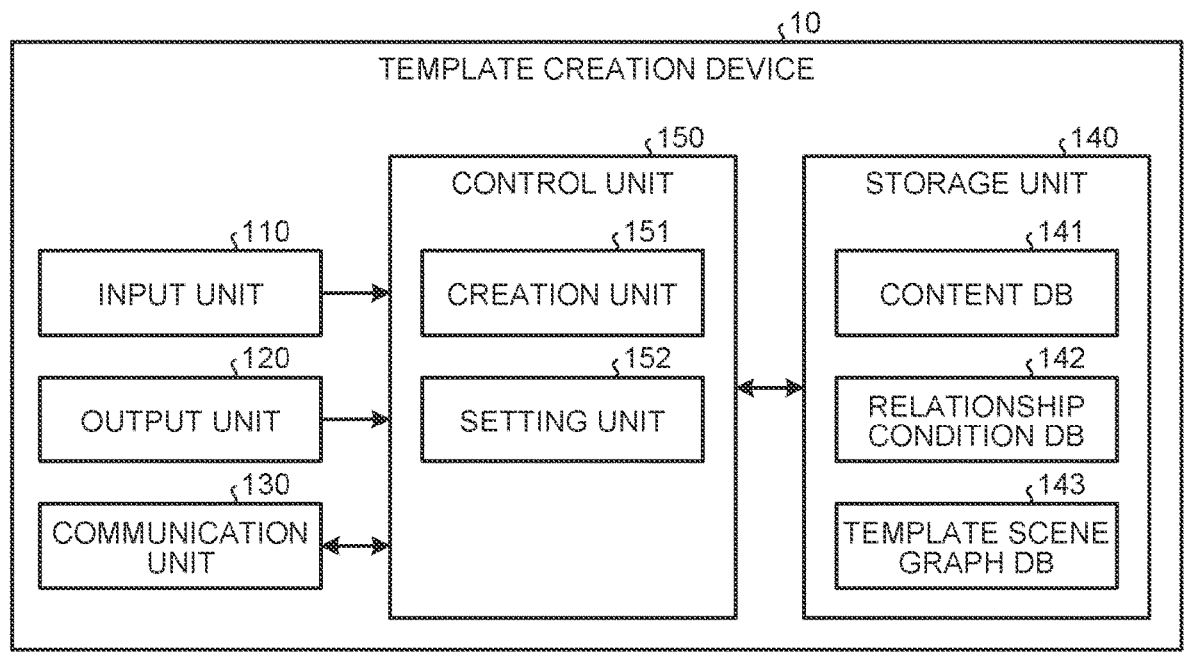
FIG. 2 is a diagram illustrating a configuration example of a template creation device.

<2-1. Configuration Example of Template Creation Device>
A configuration example of the template creation device will be described using FIGS. 2 to 5. FIG. 2 is a diagram illustrating a configuration example of the template creation device.

As illustrated in FIG. 2, the template creation device 10 includes an input unit 110, an output unit 120, a communication unit 130, a storage unit 140, and a control unit 150.

Each block (the input unit 110 to the control unit 150) included in the template creation device 10 is a functional block indicating a function of the template creation device 10. These functional blocks may be software blocks or hardware blocks. For example, each of the foregoing functional blocks may be one software module realized by software (including a microprogram), or may be one circuit block on a semiconductor chip (die). Naturally, each functional block may be one processor or one integrated circuit. The method for configuring the functional block is arbitrary. Each block included in the template creation device 10 may be configured by a functional unit that is different from the example illustrated in FIG. 2.

The input unit 110 is realized by various input devices such as a keyboard, a mouse, or a touch panel, and inputs various information. For example, the input unit 110 acquires a template space model, which is a typical spatial layout for executing an AR application, and inputs the template space model to the template creation device 10.

The template space model is a three-dimensional space model with which a content creator considers how to arrange AR content, and which includes three-dimensional shapes in a space (the shapes of individual objects), identification information for each object, object categories, and relationships between objects. The template space model is generated using a three-dimensional space recognition technique. Note that the template space model only needs to be a model that includes three-dimensional shapes in a space (the shapes of individual objects), identification information for each object, object categories, and relationships between objects, and may be a computer-aided design (CAD) model.

The output unit 120 is realized by various output devices such as a display and a speaker, and outputs various information.

The communication unit 130 is realized by a communication module for performing communication via a network. The communication unit 130 transmits and receives information to and from the content display device 20 via a network, for example.

The storage unit 140 is realized by the aforementioned storage device 12 or the like, and stores data and the like that is used for various processing relating to the template creation phase. As illustrated in FIG. 2, the storage unit 140 includes a content DB 141, a relationship condition DB 142, and a template scene graph DB 143.

The content DB 141 stores AR content data. The relationship condition DB 142 stores relationship conditions for performing appropriate arrangement of AR content with respect to a spatial context and changes in the spatial context, and for performing interactions. The template scene graph DB 143 stores AR content arrangement rules that represent relationships between a template space model and the AR content in an abstract manner.

The control unit 150 is realized by the aforementioned control device 13 and executes various processing relating to the template creation phase. As illustrated in FIG. 2, the control unit 150 includes a creation unit 151 and a setting unit 152.

Figure 3:
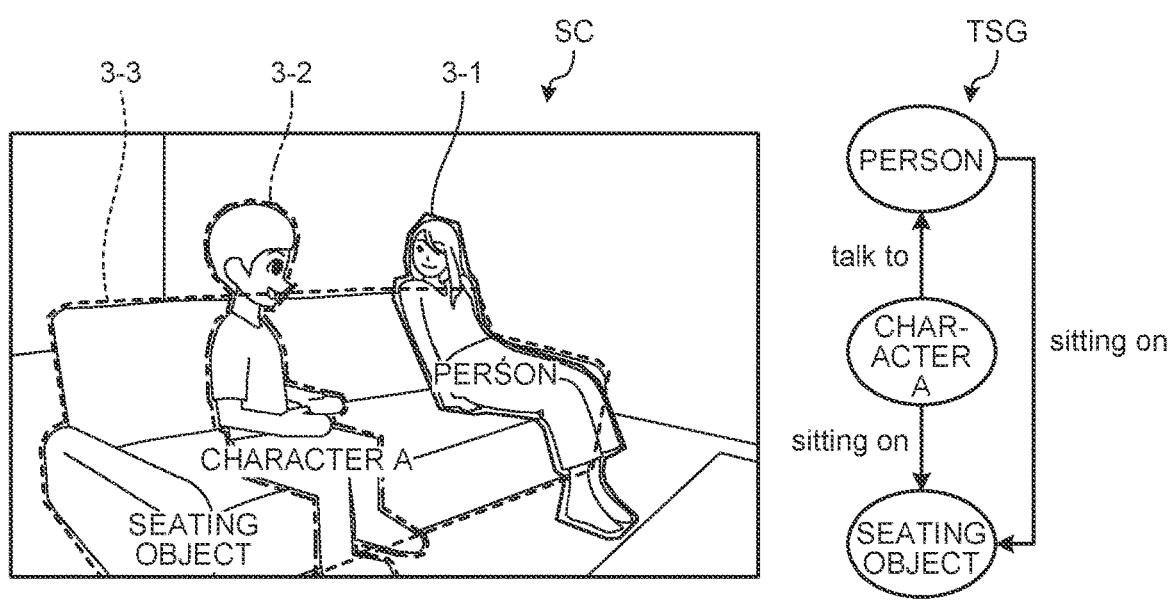
FIG. 3 is a diagram illustrating an example of an AR content arrangement image and a corresponding template scene graph.

The creation unit 151 executes, for the template space model, the generation of a template scene graph through content arrangement. FIG. 3 is a diagram illustrating an example of an AR content arrangement image and a corresponding template scene graph.

For example, it is assumed that a person 3-1 and a seating object 3-3 exist in the template space model to be inputted. Further, as illustrated in the left diagram of FIG. 3, it is assumed that the content creator realizes a scene SC in which a virtual character 3-2 (hereinafter appropriately described as "character A"), which is AR content, is made to sit beside a person 3-1 sitting on the seating object 3-3 and has a conversation with the person 3-1. At such time, the content creator sets, in the template space model, relationships (relationship labels) between the respective nodes (the "person", "character A", and "seating object") on the assumption of a scene in which the person 3-1 is sitting on the seating object 3-3 ("sitting on"), the "character A" is made to sit on the seating object 3-3 ("sitting on"), and the "character A" has a conversation with the person 3-1 ("talking to"). Upon receiving inputs of such settings, the creation unit 151 generates a template scene graph TSG, which is illustrated in the right diagram of FIG. 3. That is, the template scene graph TSG is template data that defines the relative relationships, in the AR content, between a first real object (for example, the seating object 3-3), a second real object (for example, the person 3-1), and a virtual object (for example, the character A). Relative relationships include a relative positional relationship between the first real object, the second real object, and the virtual object, and an interactive action that can be taken by the virtual object with respect to the first real object and/or the second real object. In the template scene graph, relationship labels such as "sitting on" and "talking to", which define relationships between nodes, are assigned. For example, "sitting on", which is a relationship label, is a label for defining that an interaction is performed such that "character A" is made to sit on seating 3-3. Furthermore, "talking to", which is a relationship label, is a label for defining that an interaction is performed such that "character A" is made to have a conversation with the person 3-1.

In the content experiential phase, an arrangement of AR content is determined so as to realize this template scene graph TSG. Thus, a content arrangement reflecting the intention of the content creator can be realized. Furthermore, a plurality of template scene graphs TSG can be included in an AR application, and a temporal behavior change or a situational change in the AR content can be represented by switching to another template scene graph after the "character A" finishes a conversation. Thus, by using a template scene graph TSG that represents the relationships between objects in a template space model in an abstract manner, it is not necessary to process low-order data such as mesh data, and it is possible to execute processing that rapidly tracks temporal behavior changes or situational changes in the AR content.

Note that a template scene graph TSG may also be generated in response to an operation by a content creator, or the creation unit 151 may automatically infer a scene that can be realized in a template space model and automatically generate a template scene graph TSG that corresponds to the inferred scene.

Figure 4:
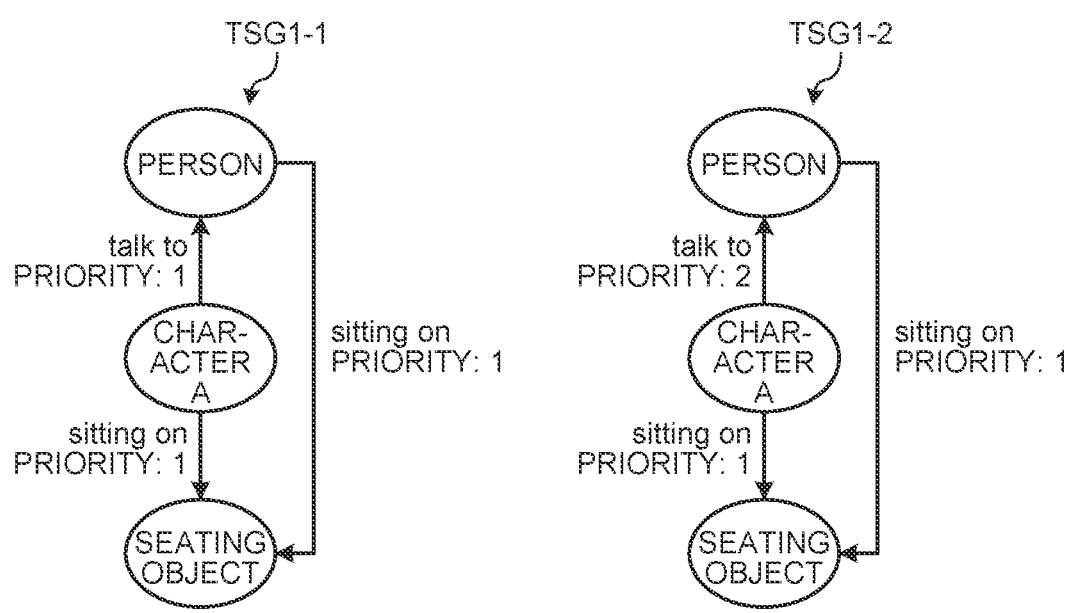
FIG. 4 is a diagram illustrating an example of priority settings.

The setting unit 152 sets priorities for the relationships between nodes in the template scene graph TSG generated by the creation unit 151. These priorities indicate to what degree a particular relationship is prioritized in relative terms among the relationships between nodes of the template scene graph TSG. FIG. 4 is a diagram illustrating an example of priority settings.

When the relationships between the nodes in the template scene graph TSG are treated equally, the setting unit 152 sets all the priorities between the nodes in the template scene graph TSG identically to "1" as per template scene graph TSG1-1, which is illustrated in the left diagram of FIG. 4, for example. Furthermore, in a case where priority is given to "character A" having a conversation with the person rather than the person sitting on the seating object or the "character A" sitting on the seating object, the setting unit 152 sets the priority of the relationship in which "character A" has a conversation with the person to "2", and sets the priorities of relationships other than the relationship in which "character A" has a conversation with the person to "1", which is lower than the priority of the relationship in which "character A" has a conversation with the person, as per a template scene graph TSG1-2, which is illustrated in the right diagram of FIG. 4.

Subsequently, the setting unit 152 sets relationship conditions for performing appropriate arrangement of AR content with respect to a spatial context and changes in the spatial context, and for performing interactions. FIG. 5 is a diagram illustrating an example of relationship conditions.

A relationship condition is a condition set by the content creator for arranging and interacting with AR content as intended, and is set based on physical norms, social norms, temporal norms, and the like.

A condition based on a physical norm predefines whether AR content ("character A"), which is a virtual object, can physically interact with an object. As an example of a condition, based on a physical norm, for establishing the positional relationship of the relationship label "sitting on", for example, between nodes of the template scene graph TSG, as illustrated in FIG. 5, the condition is that there should be no obstacle on the seat surface of the target object which is to be sat on. In addition, as illustrated in FIG. 5, as an example of a condition for establishing the positional relationship of the relationship label "talking to" between nodes of the template scene graph TSG, the condition is that a conversation partner should be within 2 m (meters).

Furthermore, a condition based on a social norm predefines whether the AR content ("character A") can interact with an object on the assumption of a situation where, although an interaction such as sitting on a chair even though another person is sitting thereon is physically possible, such an interaction would not be socially acceptable. As an example of a condition, based on a social norm, for establishing the positional relationship of the relationship label "sitting on", for example, between nodes of the template scene graph TSG, the condition is that the target object which is to be sat on should not be a chair (a seating object) on which a person is already sitting.

Furthermore, a condition based on a temporal norm assumes a case where the relationship between objects including the AR content ("character A") changes according to the movement of the objects in real space as time elapses, such as from the past to the present or from the present to the future, and is predefined so as to enable the AR content to interact with the object as naturally as possible. As an example of a condition, based on a temporal norm, for establishing the positional relationship of the relationship label "sitting on" at present in a case where the positional relationship of the relationship label "sitting on" has been established in the past, 10 seconds or more must have elapsed since the positional relationship of the relationship label "sitting on" was established in the past. In addition, no matter what the past relationship label is ("any"), the condition that the user should be able to sit down within five seconds is an example of a condition for establishing the positional relationship of the relationship label "sitting on" at present. Furthermore, in a case where control is performed to switch the template scene graph TSG in response to the progress of an AR application, an exemplary condition for when the template scene graph TSG is switched to the next template scene graph TSG is the condition that the positional relationship of the relationship label "talking to" or "holding" must be established in the future in order to establish the relationship of the relationship label "sitting on" at present.

Among the aforementioned relationship conditions, the conditions based on physical norms and social norms do not have temporal constraints and function as conditions for determining timely positional relationships of AR content according to real space recognition results. Furthermore, the conditions based on temporal norms have temporal constraints and function as conditions for determining the positional relationships of AR content over time from the past, to the present, and in the future.

The aforementioned relationship conditions are used to arrange the AR content in the current scene graph representing the current real space in an abstract manner in the content experiential phase to narrow down the positional relationship candidate list for evaluating goodness of fit with the template scene graph TSG. By using the template scene graph TSG to represent the arrangement of the AR content in an abstract manner, it is possible to narrow down positional relationship candidates based on an abstract relationship. Furthermore, using conditions based on a temporal norm that are set as relationship conditions enables AR content arrangement that corresponds to a temporal change in the real space. The template scene graph TSG and the relationship conditions created in the template creation phase are recorded and used for appropriate AR content arrangement processing (content mapping processing) in the content experiential phase.

<2-2. Configuration Example of Content Display Device>

Figure 6:
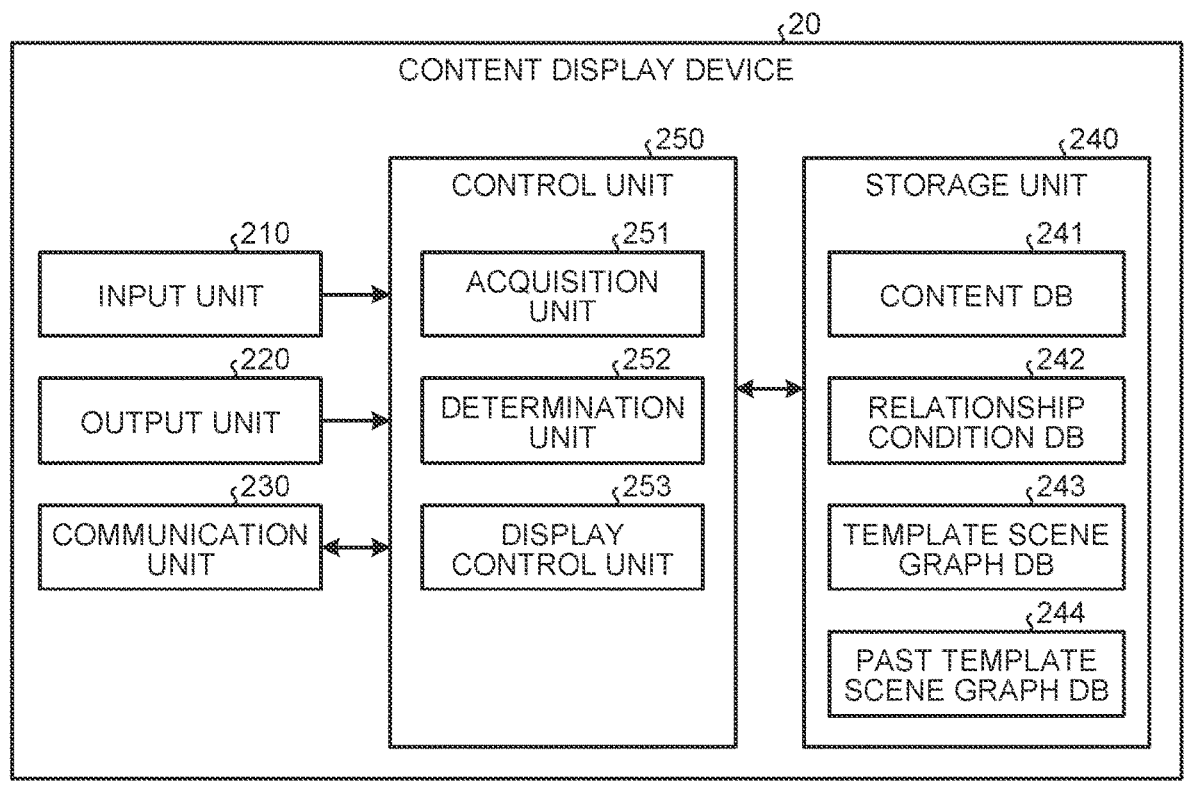
FIG. 6 is a diagram illustrating a configuration example of a content display device.

A configuration example of a content display device will be described using FIGS. 6 to 18. FIG. 6 is a diagram illustrating a configuration example of the content display device.

As illustrated in FIG. 6, a content display device 20 includes an input unit 210, an output unit 220, a communication unit 230, a storage unit 240, and a control unit 250.

Each block (the input unit 210 to the control unit 250) included in the content display device 20 is a functional block indicating a function of the content display device 20. These functional blocks may be software blocks or hardware blocks. For example, each of the foregoing functional blocks may be one software module realized by software (including a microprogram), or may be one circuit block on a semiconductor chip (die). Naturally, each functional block may be one processor or one integrated circuit. The method for configuring the functional block is arbitrary. Note that each block included in the content display device 20 may also be configured by a functional unit different from that in the example illustrated in FIG. 6.

The input unit 210 is realized by various input devices such as a keyboard, a mouse, or a touch panel, and inputs various information. Furthermore, the input unit 210 includes the RGB-D data input interface 21 and acquires RGB-D data from the RGB-D sensor 2 (see FIG. 1), and inputs the RGB-D data to the content display device 20, for example. The RGB-D data is configured from RGB images and depth data. The RGB-D data functions as three-dimensional data of a real space detected by the RGB-D sensor 2.

The output unit 220 is realized by various output devices such as a display and a speaker that function as the aforementioned display device 22, and outputs various information. The output unit 220 can output, for example, video data in which the AR content is appropriately mapped.

The communication unit 230 is realized by a communication module for performing communication via a network. The communication unit 230 transmits and receives information to and from the template creation device 10 via a network, for example.

The storage unit 240 is realized by the aforementioned storage device 23 or the like, and stores data and the like that is used for various processing relating to the content experiential phase. As illustrated in FIG. 2, the storage unit 240 includes a content DB 241, a relationship condition DB 242, a template scene graph DB 243, and a past template scene graph DB 244.

The content DB 241 stores AR content data acquired from the template creation device 10. The relationship condition DB 242 stores relationship condition data acquired from the template creation device 10. As described above, a relationship condition is a condition for performing appropriate arrangement of AR content with respect to a spatial context and changes in the spatial context, and for performing interactions. (see FIG. 5). The template scene graph DB 143 and the past template scene graph DB 144 store data of the template scene graph TSG to be acquired from the template creation device 10. The template scene graph TSG is data indicating AR content arrangement rules that represent relationships between the template space model and the AR content in an abstract manner, as described above.

The control unit 250 is realized by the foregoing control device 24 and executes various processing relating to the content experiential phase. As illustrated in FIG. 6, the control unit 250 includes an acquisition unit 251, a determination unit 252, and a display control unit 253.

The acquisition unit 251 acquires the template scene graph TSG. The template scene graph TSG is, for example, template data (an example of scene graph data) that defines the relative relationships, in the AR content, between a first real object, a second real object, and a virtual object. Relative relationships include a relative positional relationship between the first real object, the second real object, and the virtual object, and an interactive action that can be taken by the virtual object with respect to the first real object and/or the second real object. Interactive actions include AR content (for example, "character A"), which is a virtual object, sitting on a first real object (for example, a seating object), holding the first real object (for example, an object that can be held), and talking to a second real object (for example, a person).

The determination unit 252 determines a relative relationship between the first real object and the second real object from RGB-D data, which is three-dimensional data of a real space detected by the sensor (RGB-D sensor 2). That is, the determination unit 252 determines, from the RGBD-D data, the relative relationship between the first real object and the second real object based on scene graph data that represents the real space in an abstract manner.

Figure 7:
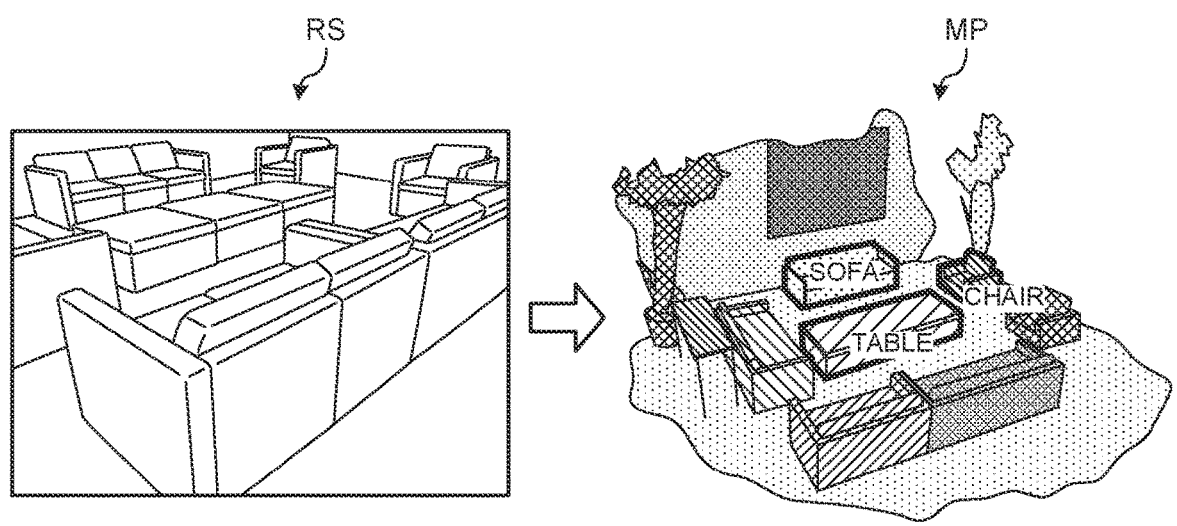
FIG. 7 is a diagram illustrating an example of a three-dimensional space recognition map.

More specifically, the determination unit 252 first generates a three-dimensional space recognition map from the RGB-D data. The three-dimensional space recognition map is a map constructed based on the real world including information about shapes (mesh, point group, and the like), categories (chair, sofa, table, and the like), and individual object identification (chair #1, chair #2, and so forth) that pertain to an object in real space. For the processing to generate the three-dimensional space recognition map, the techniques, as disclosed in Non-Patent Document "Narita et al., "PanopticFusion: Online Volumetric Semantic Mapping at the Level of Stuff and Things", IEEE/RSJ International Conference on Intelligent Robots and Systems (IROS 2019), 2019.", and Non-Patent Document "Grinvald et al., "Volumetric Instance-Aware Semantic Mapping and 3D Object Discovery", IEEE Robotics and Automation Letters, 2019.", or the like, can be used, for example. FIG. 7 is a diagram illustrating an example of a three-dimensional space recognition map. Based on a real space RS, which is illustrated in the left diagram of FIG. 7, a display is provided using the three-dimensional space recognition map MP illustrated in the right diagram of FIG. 7. Using the three-dimensional space recognition map MP, it is possible to represent not only the shapes of individual objects in real space, but also to represent such objects separately using different colors, though same are not represented in detail in FIG. 7.

Subsequently, the determination unit 252 recognizes the relationship between objects (the first real object and the second real object) based on the three-dimensional space recognition map (see, for example, FIG. 7), and generates a current scene graph (hereinafter, it is described as a "scene graph") representing the space in an abstract manner. As the relationship between the objects, a positional relationship based on distance or direction, or an interaction (sitting, having a conversation) indicating an action between the objects, or the like, may be considered. Within the former positional relationship, the relationship of a distance norm such as near/far can be easily calculated from the three-dimensional space recognition map. Regarding relationships of object direction norms such as front, back, left, right, upper, and lower, it is necessary to estimate the posture for each object recognized using the three-dimensional space recognition map. For the posture estimation, the technique for estimating object posture from RGB-D data, as disclosed in the document "Wang et al., "Normalized Object Coordinate Space for Category-Level 6D Object Pose and Size Estimation", IEEE Conference on Computer Vision and Pattern Recognition (CVPR), 2019.", can be used.

Figure 8:
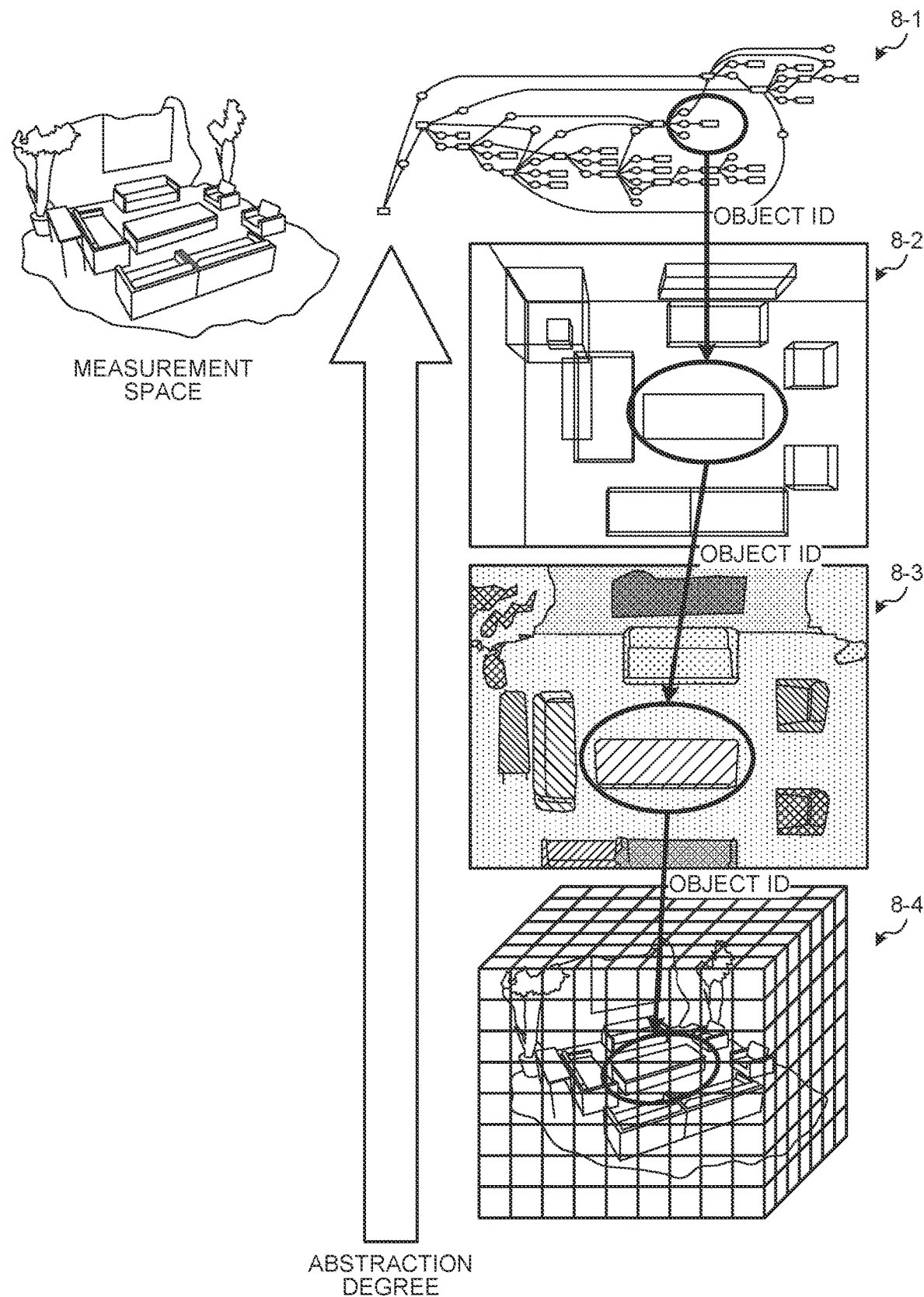
FIG. 8 is a diagram illustrating an example of information that can be accessed from a scene graph generated from a three-dimensional space recognition map.

As a method for recognizing an interaction as a relationship, a method for integrating an image recognition result into a three-dimensional space recognition map by using the technique for recognizing an interaction from an RGB image, as disclosed in the document "Xu et al., "Scene Graph Generation by Iterative Message Passing", IEEE Conference on Computer Vision and Pattern Recognition (CVPR), 2017.", can be used. Alternatively, a method for recognizing an interaction from a three-dimensional positional relationship between objects, as disclosed in the document "Savva et al., "PiGraphs: Learning Interaction Snapshots from Observations", ACM Transactions on Graphics (TOG), 2016.", can be used. By integrating the relationships between the objects obtained in this manner, a scene graph representing the entire scene in an abstract manner can be generated. The content display device 20 executes content arrangement (content mapping) processing based on the scene graph. FIG. 8 is a diagram illustrating an example of information that can be accessed from a scene graph generated from a three-dimensional space recognition map.

As illustrated in FIG. 8, a scene graph 8-1 includes information items such as a bounding box 8-2, a mesh 8-3, and a TSDF & label map 8-4, which are used to generate the scene graph 8-1. The objects included in each information item are associated with the same object ID. The scene graph 8-1 is an abstract representation of the relationship between objects, but the bounding box 8-2 is an abstract representation of the shape and position of each object, and includes information such as the outer dimensions, position, and direction of the objects. Furthermore, the mesh 8-3 is a mesh representation of the three-dimensional space recognition map, and includes a point group of an object, a polygon (surface) (connection between points), and label information for each point and each polygon. The TSDF & label map 8-4 is obtained by volumetrically representing a three-dimensional space by using a plurality of voxels, and is configured by assigning a distance to the surface of an object, the weight of the object, and an assigned label reliability, and the like, to each voxel.

Figure 9:
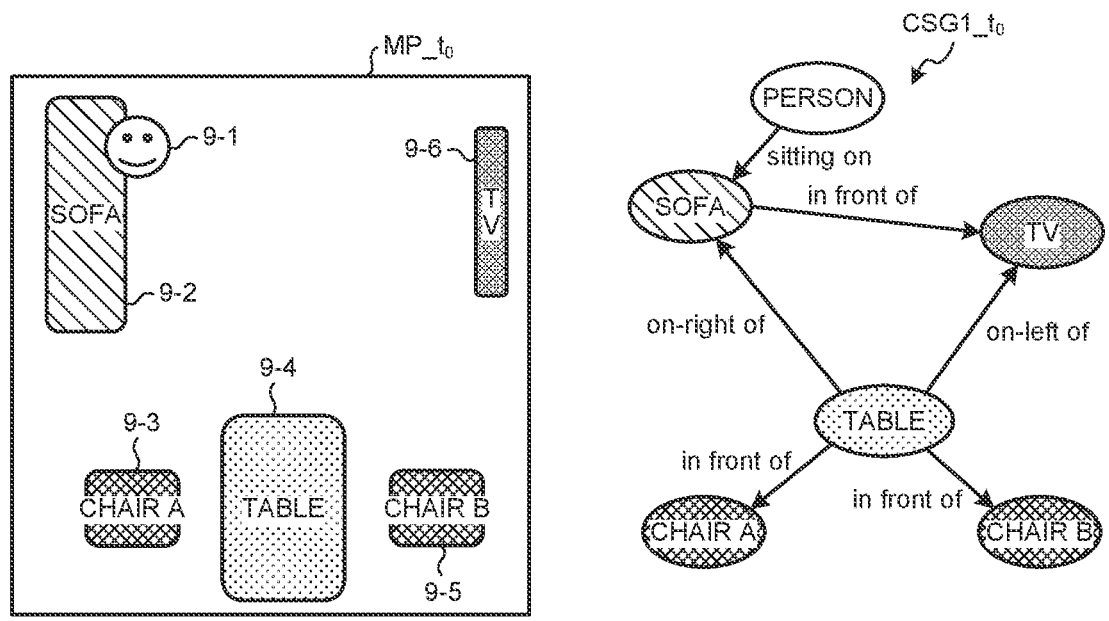
FIG. 9 is a diagram illustrating an example of a three-dimensional space recognition map and a scene graph corresponding to the three-dimensional space recognition map at a certain time.
Figure 10:
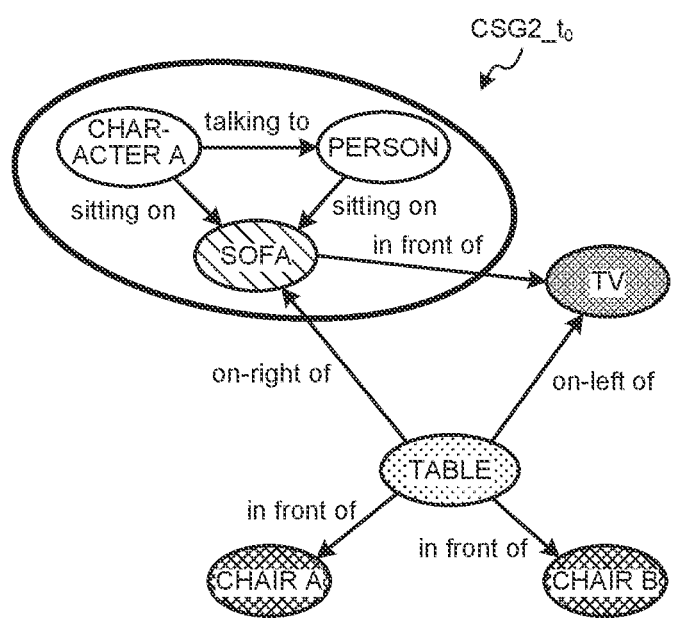
FIG. 10 is a diagram illustrating a mapping example of AR content with respect to a scene graph at a certain time.

FIG. 9 is a diagram illustrating an example of a three-dimensional space recognition map and a scene graph corresponding to the three-dimensional space recognition map at a certain time. FIG. 10 is a diagram illustrating a mapping example of AR content with respect to a scene graph at a certain time.

Through the foregoing processing, a three-dimensional space recognition map MP_$t_0$ (see the left diagram in FIG. 9) at a certain time $t_0$, which is generated from the RGB-D data, is represented as a scene graph CSG1_$t_0$ (see the right diagram in FIG. 9). The three-dimensional space recognition map MP_$t_0$ includes, for example, a "person" 9-1, a "sofa" 9-2, a "chair A" 9-3, a "table" 9-4, a "chair B" 9-5, and a "TV" 9-6 as the results of space recognition. "Sofa" 9-2, "chair A" 9-3, "table" 9-4, "chair B" 9-5, and "TV" 9-6 are examples of the first real object. "Person" 9-1 is an example of a second real object. For the sake of expediency in the description, a description of the content mapping process at time $t_0$ is omitted, but the display control unit 253 performs content mapping using the template scene graph TSG (see the right diagram in FIG. 3) on the scene graph of the scene graph CSG1_$t_0$ using the method to be described below, thereby obtaining a scene graph CSG2_$t_0$, which is illustrated in FIG. 10. Thus, content arrangement corresponding to the spatial context is realized based on a scene graph representing the relationship between objects that exist in real space in an abstract manner and a template scene graph representing the scene image of the content creator in an abstract manner. In the following description, "person" 9-1 will be simply described as "person"; "sofa" 9-2 will be simply described as "sofa", "chair A" 9-3 will be simply described as "chair A", "table" 9-4 will be simply described as "table", "chair B" 9-5 will be simply described as "chair B", and "TV" 9-6 will be simply described as "TV".

Figure 11:
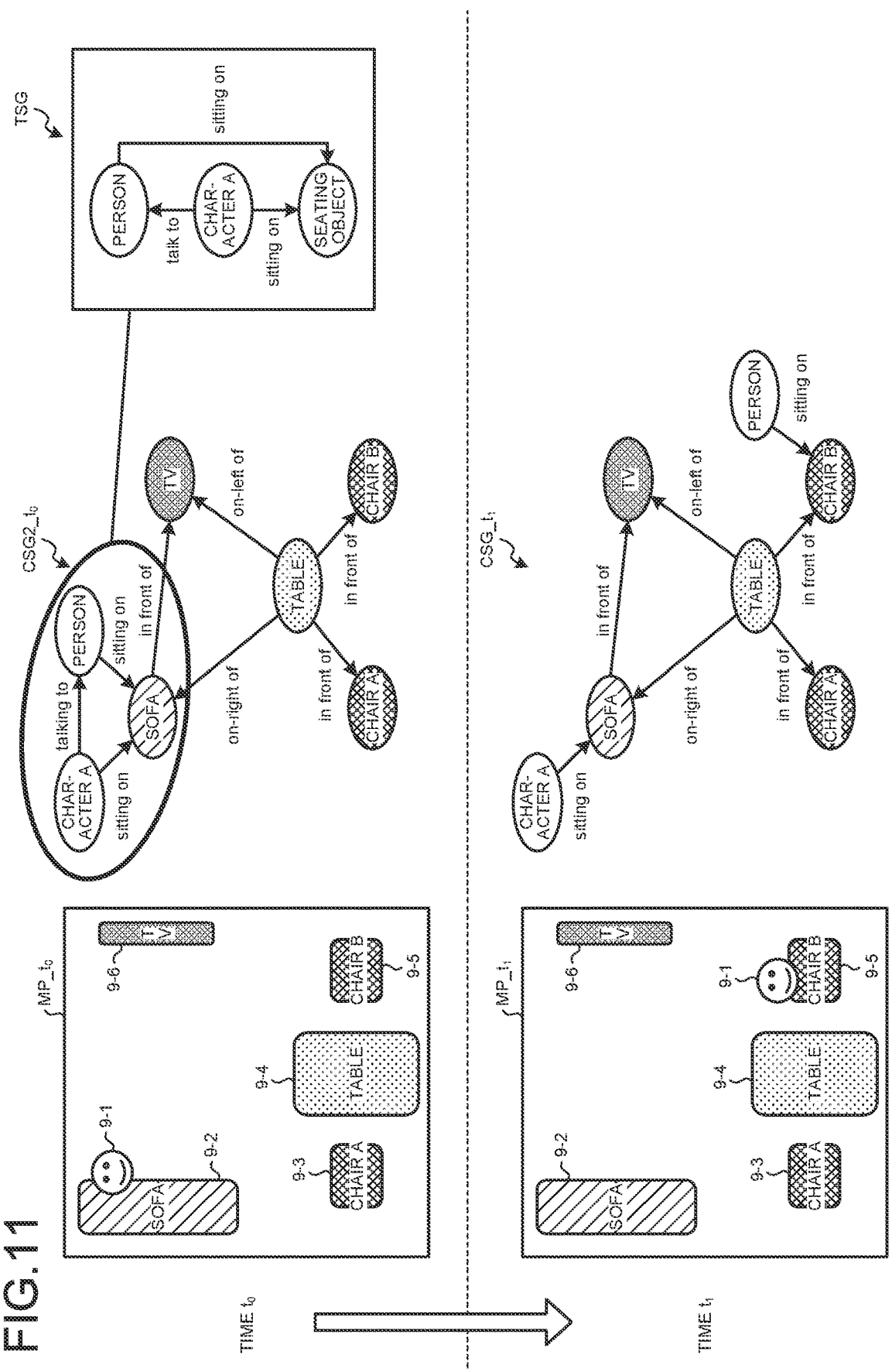
FIG. 11 is a diagram illustrating an example of a three-dimensional space recognition map and a scene graph after a certain time has elapsed since the situation illustrated in FIG. 9.

FIG. 11 is a diagram illustrating an example of a three-dimensional space recognition map and a scene graph after a certain time has elapsed since the situation illustrated in FIG. 9. FIG. 12 is a diagram illustrating a comparative example of scene graphs at different times. Note that, for the sake of expediency in the description, it is assumed that a time of 10 seconds or more has elapsed from time $t_0$ to time $t_1$.

As illustrated in FIG. 11, it is assumed that, in the real space, there is a change in the situation in which the "person" moves away from the "sofa" and sits on the "chair B" until time $t_1$ is reached, whereupon a certain time (10 seconds or more) has elapsed since the situation illustrated in FIG. 9. In this case, a three-dimensional space recognition map MP_$t_1$ (see the lower left diagram in FIG. 11) at a certain time $t_1$ is represented as a scene graph CSG_$t_1$ (see the lower right diagram in FIG. 11). As illustrated in FIG. 12, the determination unit 252 compares the scene graph CSG2_$t_0$ with the scene graph CSG_$t_1$, and determines the movement of the first real object ("sofa", "chair A", "chair B", or the like) and the second real object (the "person" or the like). In addition, the determination unit 252 compares the scene graph CSG2_$t_0$ with the scene graph CSG1_$t_1$ to detect a change in the relationship between the objects due to a temporal change from the time $t_0$ to the time $t_1$.

In the detection of the change in the relationship between the objects accompanying the temporal change from the time $t_0$ to the time $t_1$, the determination unit 252 determines whether or not a change in the relationship has occurred for each object having a relationship with "character A", which is AR content. The determination unit 252 then adds a mark (hereinafter, described as a "change mark") indicating that a change has occurred in AR content pertaining to an object whose relationship has changed. For example, as illustrated in FIG. 12, because, as a result of a comparison between the scene graph CSG2_$t_0$ and the scene graph CSG_$t_1$, a change in the relationship of "sitting on" with the "chair B" instead of "sitting on" with the "sofa" has occurred for the "person" having a relationship with "character A", the determination unit 252 assigns a change mark (for example, FIG. 12-1) to "character A" pertaining to "person". Furthermore, cases where it is desirable to take into account a change in an object that is not directly related to the AR content may also be considered. In such cases, it is possible to set the distance from the AR content to the object at which distance is set as a candidate for change detection, based on the distance on the scene graph (how many edges need to be passed from the AR content to the object on the scene graph), the Euclidean distance between the AR content and the object, and the like.

The display control unit 253 controls the display device 22 to arrange a virtual object (for example, character A) on or near a first real object (for example, chair A or chair B) so as to face a second real object (for example, a person) based on the relative relationship (for example, a scene graph) between the first real object and the second real object, and the template data (for example, the template scene graph TSG). In addition, after arranging the virtual object, the display control unit 253 executes an interactive action of the virtual object with respect to the second real object. In addition, in a case where the three-dimensional data (RGB-D data) includes a plurality of first real objects, the display control unit 253 arranges, based on the template data, a virtual object on the first real object whereon no other real object is arranged. Furthermore, in a case where the three-dimensional data includes a plurality of first real objects, the display control unit 253 arranges the virtual object on one of the plurality of first real objects which is closer to the second real object. In addition, in a case where, in the relative relationship, the distance between the first real object and the second real object is a predetermined distance or more, the display control unit 253 controls the display device 22 not to arrange the virtual object. In addition, the display control unit 253 rearranges the virtual object on the first real object on condition that a certain time or more has elapsed since the previous interactive action of the virtual object. Further, the display control unit 253 rearranges the virtual object on the first real object on condition that the virtual object can perform a predetermined interactive action with respect to the first real object within a certain time. Furthermore, the display control unit 253 rearranges the virtual object on the first real object on condition that the virtual object has a positional relationship enabling a predetermined interactive action to be executed with respect to the second real object by switching a video content scene that includes the first real object, the second real object, and the virtual object. The display control unit 253 can execute arrangement and rearrangement of virtual objects based on the relationship condition DB 241.

More specifically, the display control unit 253 lists, in the scene graph, positional relationship candidates that enable the relationships of each AR content item to be realized using a template scene graph, for content to which a change mark has been added (hereinafter described as "changed content") and AR content for which the relationship has not yet been set in the scene graph in the template scene graph (hereinafter described as "unused content").

Figure 14:
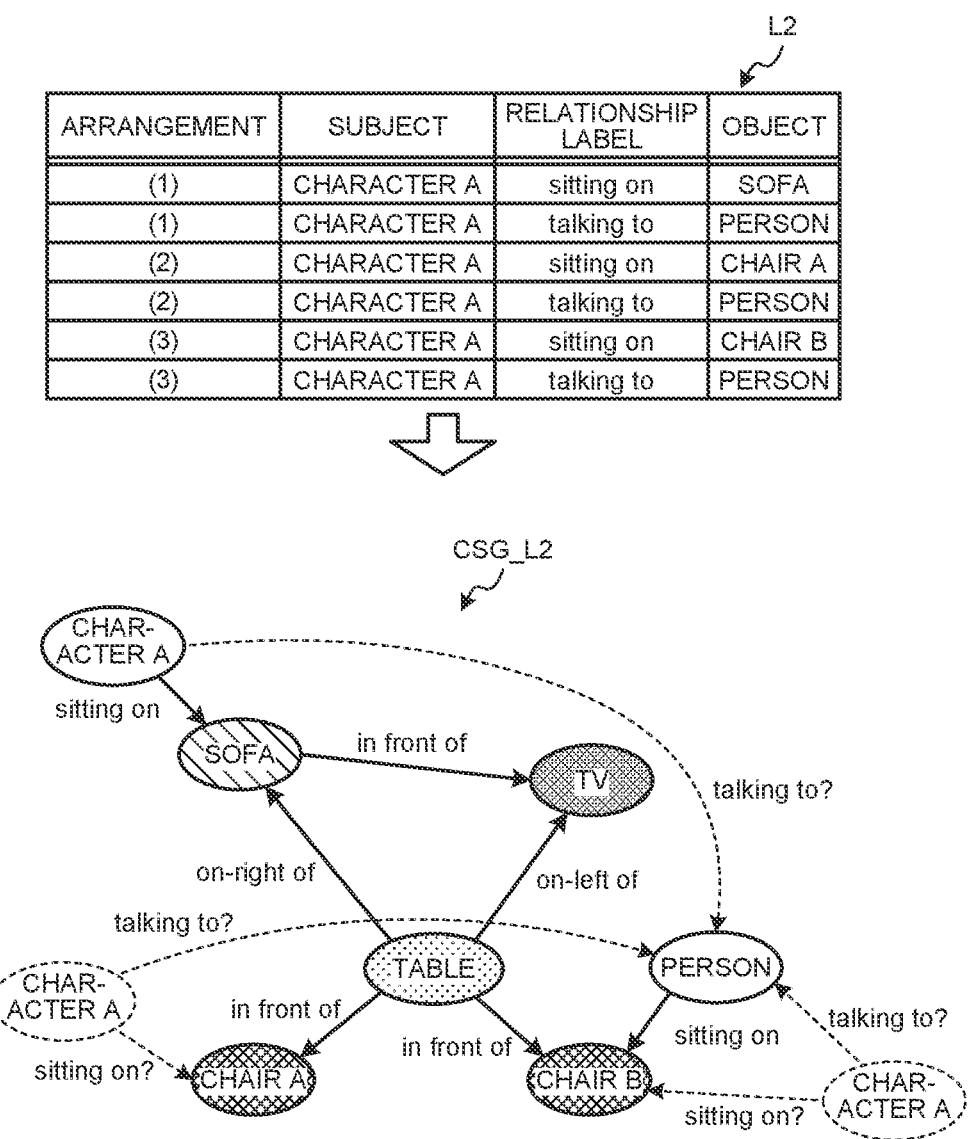
FIG. 14 is a diagram illustrating an example of positional relationship candidates with which AR content can be realized.

First, the display control unit 253 lists positional relationship candidates for clarifying the positions of changed content and unused content. A positional relationship candidate refers to a candidate with which the positional relationship (for example, the arrangement position of AR content) between objects is clarified by its relationship label (that determines the positional relationship) such as the relationship label "sitting on" described in the template scene graph TSG (see the right diagram in FIG. 3). The display control unit 253 holds information indicating which relationship label can clarify the position as a list in advance. FIGS. 13 and 14 are diagrams illustrating examples of positional relationship candidates with which AR content can be realized.

In the case of the scene graph CSG_$t_1$, the positional relationship candidates which are capable of realizing the positional relationship of the relationship label "sitting on" that is set for "character A" in the template scene graph TSG are the three candidates (arrangement (1) to (3)) illustrated in relationship list L1 in FIG. 13. Objects that enable "character A" to realize the positional relationship of the relationship label "sitting on" correspond to "sofa", "chair A", "chair B", or the like, which are objects that enable seating, and do not include "table", "TV", or the like. The display control unit 253 discriminates objects that enable seating from among a plurality of objects included in the scene graph by creating a list of positional relationships and interaction labels that can be obtained for the object category in advance. By creating a list of possible positional relationships and interaction labels for the object category in advance, for example, "table" or the like can be excluded from the search target beforehand, and an entire search for candidates in the scene graph can be avoided. When the content illustrated in the relationship list L1 is represented in the scene graph, a scene graph CSG_L1, which is illustrated in FIG. 13, is obtained, for example.

Subsequently, the display control unit 253 further lists changed content of positional relationship candidates listed in the relationship list L1, and candidates for the positional relationships between the objects. The positional relationship other than "sitting on" which is necessary for "character A" in the template scene graph TSG (for example, see the right diagram of FIG. 3.) is "talking to" with "person". Accordingly, as illustrated in relationship list L2 of FIG. 14, candidates for the positional relationship between "character A" and "person", which is changed content for the positional relationship candidates listed in the relationship list L1, are listed. That is, in the arrangements (1) to (3), "talking to" of "character A" and "person" are further listed. The content illustrated in the relationship list L2 is represented in the scene graph as per scene graph CSG_L2 illustrated in FIG. 14.

When the listing of the changed content and the candidates for the positional relationships between the objects is completed, the display control unit 253 collates each positional relationship candidate with a relationship condition (see, for example, FIG. 5), and extracts a valid positional relationship candidate from among the positional relationship candidates. That is, the display control unit 253 determines whether or not a predefined relationship establishment condition is satisfied for the relationship label corresponding to each positional relationship candidate.

More specifically, with respect to the fact that "character A" has the positional relationship of "talking to" with "person" in arrangement (1) of the relationship list L2, the display control unit 253 searches, among the relationship conditions, for a condition corresponding to the current relationship label "talking to", and determines whether or not the relationship establishment condition "the conversation partner is within 2 m (meters)" is satisfied. The position of each object in the scene graph can be acquired from lower-order information as illustrated in FIG. 7, and it can be determined, using, for example, the Euclidean distance between the objects, whether or not the relationship establishment condition corresponding to the relationship label "talking to" is satisfied. Note that the display control unit 253 also determines whether or not the relationship establishment condition is satisfied also in a case where "character A" in arrangement (2) and arrangement (3) of the relationship list L2 has the "talking to" positional relationship with the "person", similarly to the case of arrangement (1) described above.

Furthermore, in a case where "character A" has the positional relationship of "sitting on" with "chair B" in the arrangement (3) of the relationship list L2, the display control unit 253 searches, among the relationship conditions, for a condition corresponding to the current relationship label "sitting on", and determines whether or not its establishment condition is satisfied. It is assumed that, among the establishment conditions for the "character A" to have the positional relationship of "sitting on" with the "chair B", a condition that "there is no obstacle on the seat surface" based on a physical norm, and a condition that "it is not a chair on which a person is already sitting" based on a social norm are satisfied. In this case, the display control unit 253 determines whether or not the remaining establishment condition in a case where the current relationship label is "sitting on" and the past relationship label is "any (any relationship is a target)", that is, the condition of "being able to sit within 5 seconds" relating to a temporal norm is satisfied with respect to the fact that "character A" has the positional relationship of "sitting on" with "chair B". The display control unit 253 determines, from the physical distance and the movement speed of "character A", or the like, that "character A" can sit on "chair B" from time $t_0$ to $t_1$, and that the time required for the operation is 5 seconds or less. Note that "character A" has the positional relationship of the relationship label "sitting on" with "chair A" at time $t_0$, but because it is assumed that 10 seconds or more have elapsed from time $t_0$ to time $t_1$, the establishment condition of "10 seconds or more have elapsed since sitting once" is satisfied among the conditions based on a temporal norm. Note that the display control unit 253 also determines whether or not the relationship establishment condition is satisfied in a case where "character A" in the arrangement (1) of the relationship list L2 has the positional relationship of "sitting on" with "sofa", and in a case where "character A" in the arrangement (2) of the relationship list L2 has the positional relationship of "sitting on" with "chair A", similarly to the case of the arrangement (3) described above.

Furthermore, by including not only the current relationship label but also the past relationship label and the future relationship label as the relationship conditions, AR content arrangement according to a temporal change in the space becomes possible.

Figure 15:
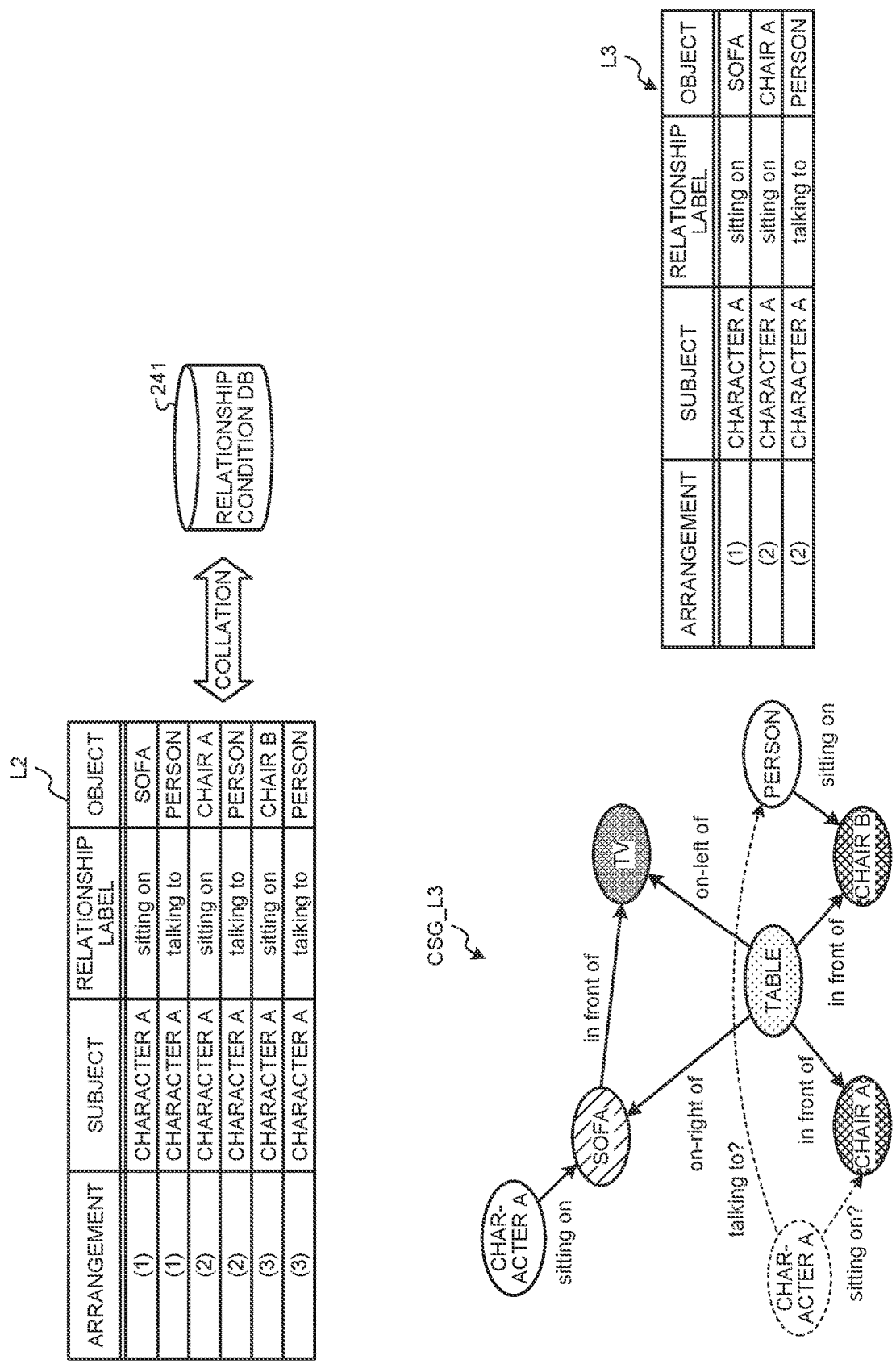
FIG. 15 is a diagram illustrating examples of lists after collation between positional relationship candidates and relationship conditions, and a corresponding scene graph.

In a case where the display control unit 253 determines, as a result of the collation, that the positional relationship of the relationship label "talking to" corresponding to the arrangement (1), among the positional relationship candidates indicated in the relationship list L2 illustrated in FIG. 14, does not satisfy a condition relating to a physical norm ("the conversation partner is within 2 m"), the display control unit deletes the corresponding positional relationship candidate from the relationship list L2 on the assumption that the positional relationship condition is not satisfied. Furthermore, in a case where it is determined that the positional relationship of the relationship label "sitting on" corresponding to the arrangement (3) does not satisfy a condition relating to a social norm ("the chair is not a chair on which a person is already seated"), the display control unit 253 deletes the corresponding positional relationship candidate from the relationship list L2 on the assumption that the positional relationship condition is not satisfied. Note that, in a case where the positional relationship of the relationship label "sitting on" corresponding to the arrangement (3) of the relationship list L2 is deleted, because the positional relationship (arrangement position) of the AR content is not confirmed, the display control unit 253 similarly deletes the positional relationship of the relationship label "talking to" corresponding to the arrangement (3). FIG. 15 is a diagram illustrating examples of lists after collation between positional relationship candidates and relationship conditions, and a corresponding scene graph.

As illustrated in FIG. 15, the display control unit 253 extracts valid positional relationship candidates from among the positional relationship candidates by using collation between the relationship list L2 and the relationship condition DB 241, and generates a relationship list L3. The content of the relationship list L3 is represented in a scene graph as per scene graph CSG_L3 illustrated in FIG. 15. In the scene graph CSG_L3, only three positional relationship candidates satisfying the relationship establishment condition are represented.

Figure 16:
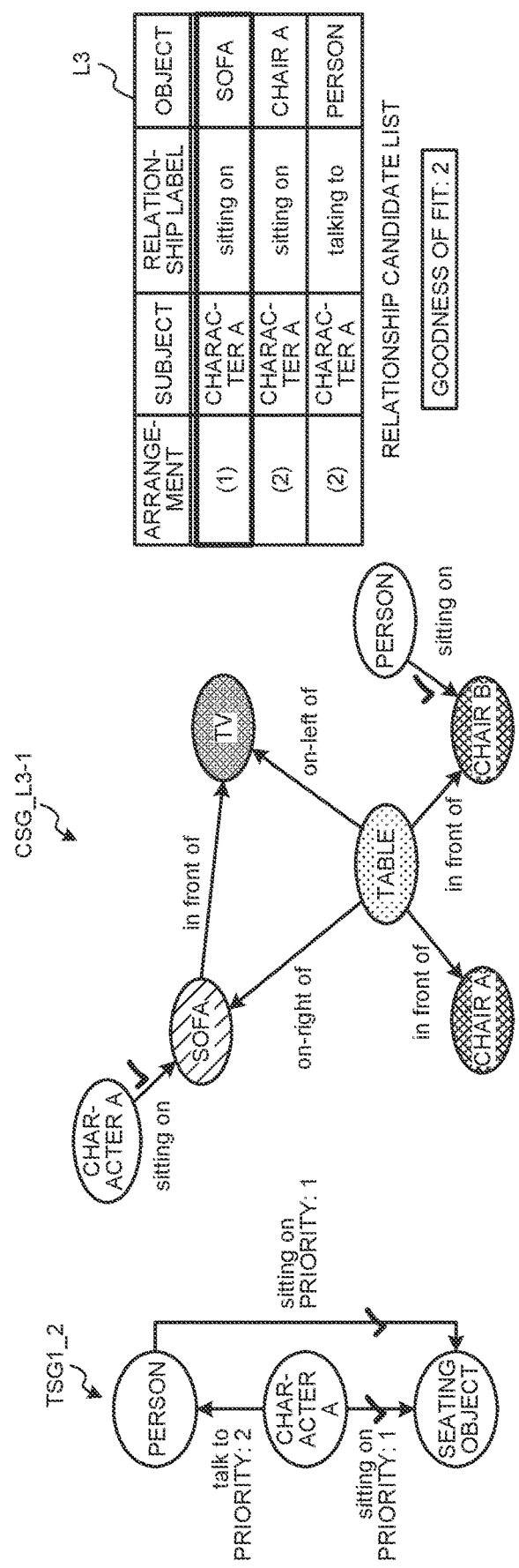
FIG. 16 is a diagram illustrating an evaluation example of the goodness of fit of positional relationship candidates.
Figure 17:
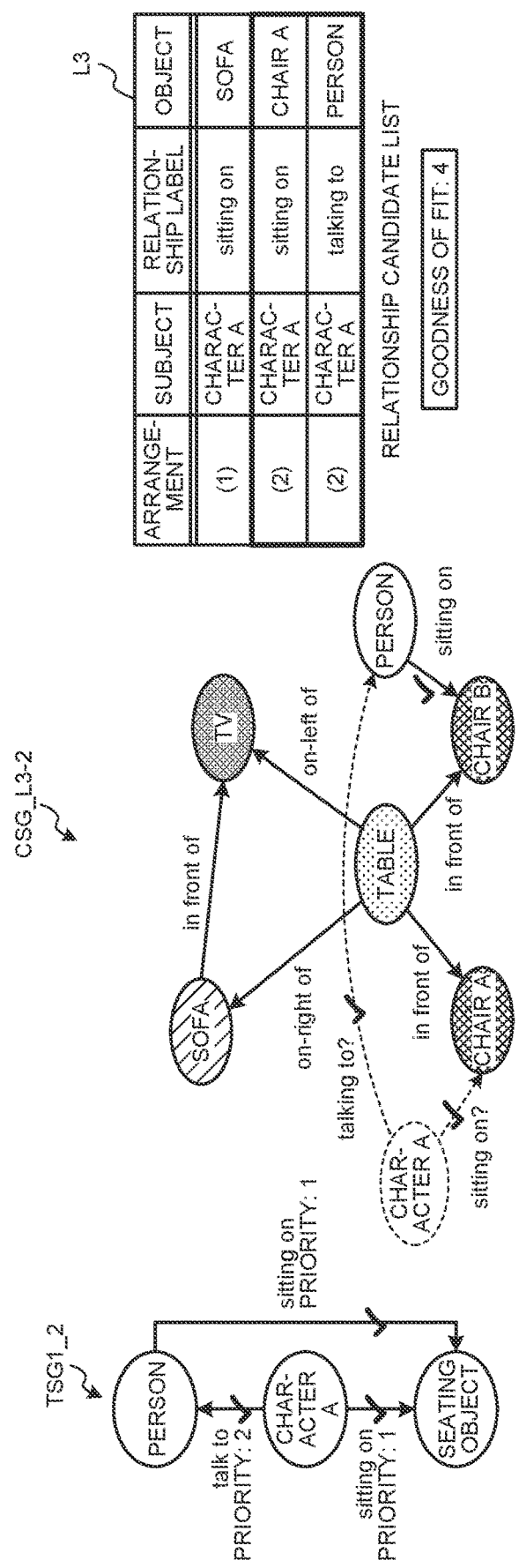
FIG. 17 is a diagram illustrating an evaluation example of the goodness of fit of positional relationship candidates.
Figure 18:
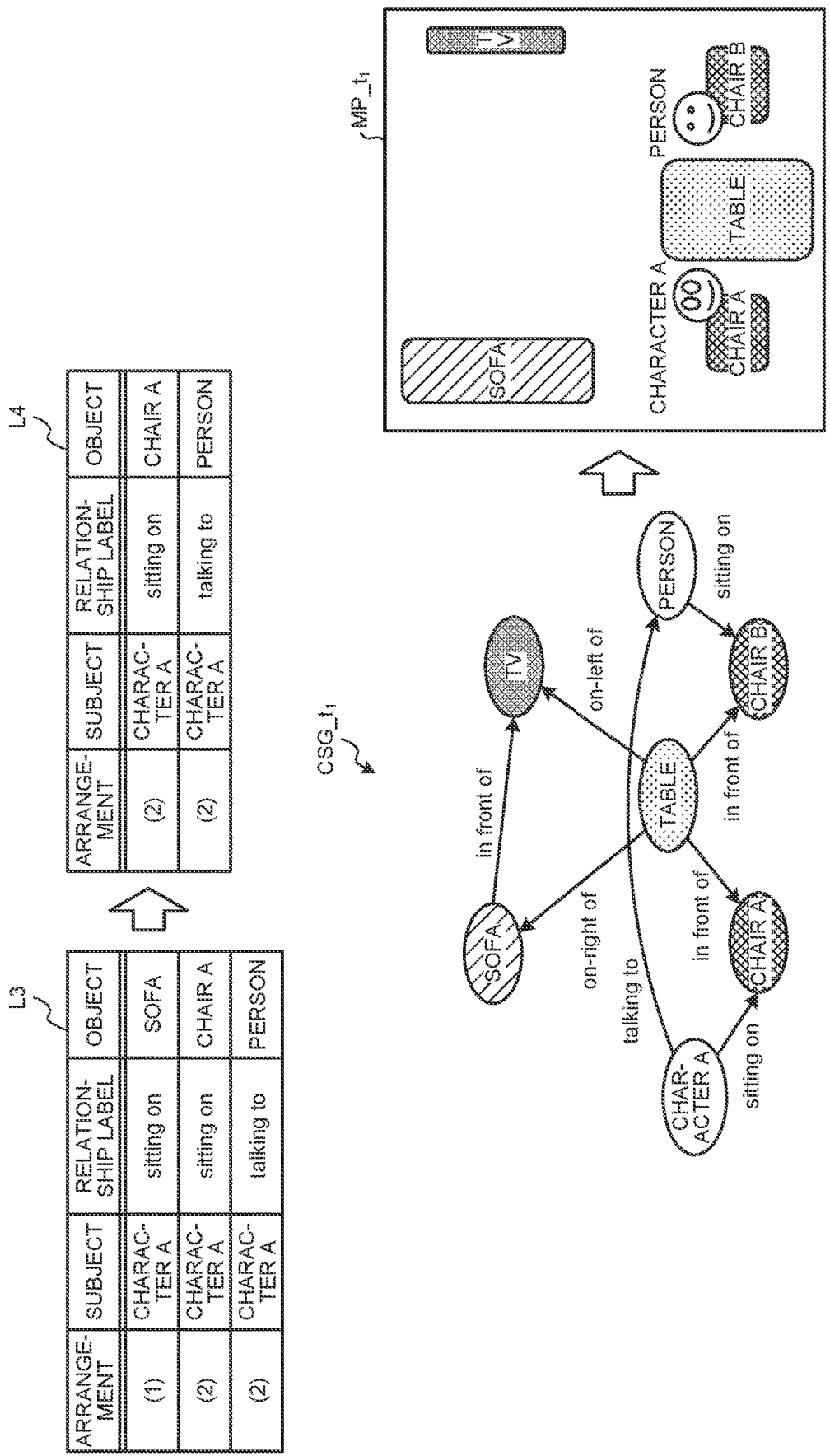
FIG. 18 is a diagram illustrating a final determination example of positional relationship candidates.

The display control unit 253 finally determines the optimum relationship to be used in the scene graph at time $t_1$ from among the three valid positional relationship candidates listed in the relationship list L3. The optimum relationship is evaluated using goodness of fit, which indicates how much each relationship (between nodes) of the positional relationship candidates fits the positional relationship set in the template scene graph TSG. This goodness of fit is evaluated as the sum of priorities of positional relationship candidates that enable the relationships to be realized in the scene graph among the priorities that are set for positional relationships which define the relationships between the nodes constituting the template scene graph TSG. The display control unit 253 determines, as an optimum positional relationship between objects to be used in the scene graph at time $t_1$, a positional relationship candidate for which the goodness of fit evaluated as the sum of priorities is equal to or greater than a threshold value and which has the maximum goodness of fit. FIGS. 16 and 17 are diagrams illustrating an evaluation example of the goodness of fit of positional relationship candidates. FIG. 18 is a diagram illustrating a final determination example of positional relationship candidates. FIGS. 16 and 17 illustrate a case where the template scene graph TSG1-2, which prioritizes a relationship in which "character A" has a conversation with the "person", is used.

As illustrated in FIG. 16, in the arrangement (1) illustrated in the relationship list L3, that is, in the scene graph CSG_L3-1 representing the positional relationships between the nodes such that the "character A" has the positional relationship "sitting on" with the "sofa", two relationships among the relationships in the template scene graph TSG1-2 are a fit. That is, the positional relationship of the relationship label "sitting on" that is set between "character A" and "sofa" and the positional relationship of the relationship label "sitting on" that is set between "person" and "chair B" are a fit. The goodness of fit, which is the sum of the priorities calculated by the display control unit 253 based on these fitting relationships, is "1+1=2" as illustrated in FIG. 16.

On the other hand, as illustrated in FIG. 17, in the arrangement (2) illustrated in the relationship list L3, that is, in the scene graph CSG_L3-2 representing the positional relationships between the nodes such that the "character A" is "sitting on" "chair A" and the "character A" is "talking to" the "person", three relationships among the relationships in the template scene graph TSG1-2 are a fit. That is, the positional relationship of the relationship label "sitting on" that is set between "character A" and "chair A", the positional relationship of the relationship label "talking to" that is set between "character A" and "person", and the positional relationship of the relationship label "sitting on" that is set between "person" and "chair B" are a fit. Therefore, the goodness of fit, which is the sum of the priorities calculated by the display control unit 253 based on these fitting relationships, is "1+2+1=4", as illustrated in FIG. 17.

Therefore, the display control unit 253 determines whether each of the goodness of fit corresponding to FIG. 16 and the goodness of fit corresponding to FIG. 17 is equal to or greater than a threshold value. When the goodness of fit in FIGS. 16 and 17 is equal to or larger than the threshold value, the display control unit 253 finally determines the positional relationship corresponding to arrangement (2) in relationship list L4 in FIG. 18 as the optimum relationship (the positional relationship between the objects) used in the scene graph at time $t_1$. As a result, because the changed content "character A" at the time $t_1$ has the positional relationship of "sitting on" with "chair A" and the positional relationship of "talking to" with "person", it is possible to arrange and interact with the AR content more appropriately using the template scene graph TSG1-2. That is, the content arrangement reflecting the intention of the content creator is realized while handling changes in the spatial context.

Note that, when the goodness of fit in FIGS. 16 and 17 is less than the threshold value, the display control unit 253 determines that there is no optimum relationship used in the scene graph at time $t_1$ among the positional relationship candidates illustrated in FIGS. 16 and 17.

The display control unit 253 uses the scene graph CSG_$t_1$ illustrated in FIG. 18 as a scene graph at time $t_1$, executes content mapping to arrange "character A", which is AR content in the three-dimensional space recognition map MP_$t_1$, and controls the displaying of the AR content (video data in which the AR content is mapped) on a display constituting the output unit 220. For the arrangement of the AR content, the positional relationship represented in the scene graph is used, and if the relationship of "sitting on" is established, the AR content is transformed into a sitting state, whereupon the AR content is arranged on a horizontal plane of a seating object (such as a chair). Furthermore, in a case where there is a relationship representing a positional relationship defined by relationship labels such as "on", "near", "in front of", or the like, for example, the AR content is randomly arranged within a range indicated by the definition from the definitions of each relationship label. When the AR content is arranged in the three-dimensional space recognition map, the AR content is superimposed and displayed on an RGB image calculated based on the RGB-D data, based on the three-dimensional position and posture of the RGB image.

Furthermore, in a case where the determination unit 252 determines the movement of the first real object ("sofa", "chair A", "chair B", and the like), the display control unit 253 can rearrange the AR content (such as "character A"), which is a virtual object, on the first real object. As a result, for example, the content can be rearranged so as to realize an interaction such as causing the virtual character to stand up once and then sit down again.

The control unit 250 repeatedly executes the aforementioned processing until the displaying of the AR content ends. As a result, it is possible to display the AR content according to a temporal change in the real space.

<2-3. Relationships Between Functions>

Figure 19:
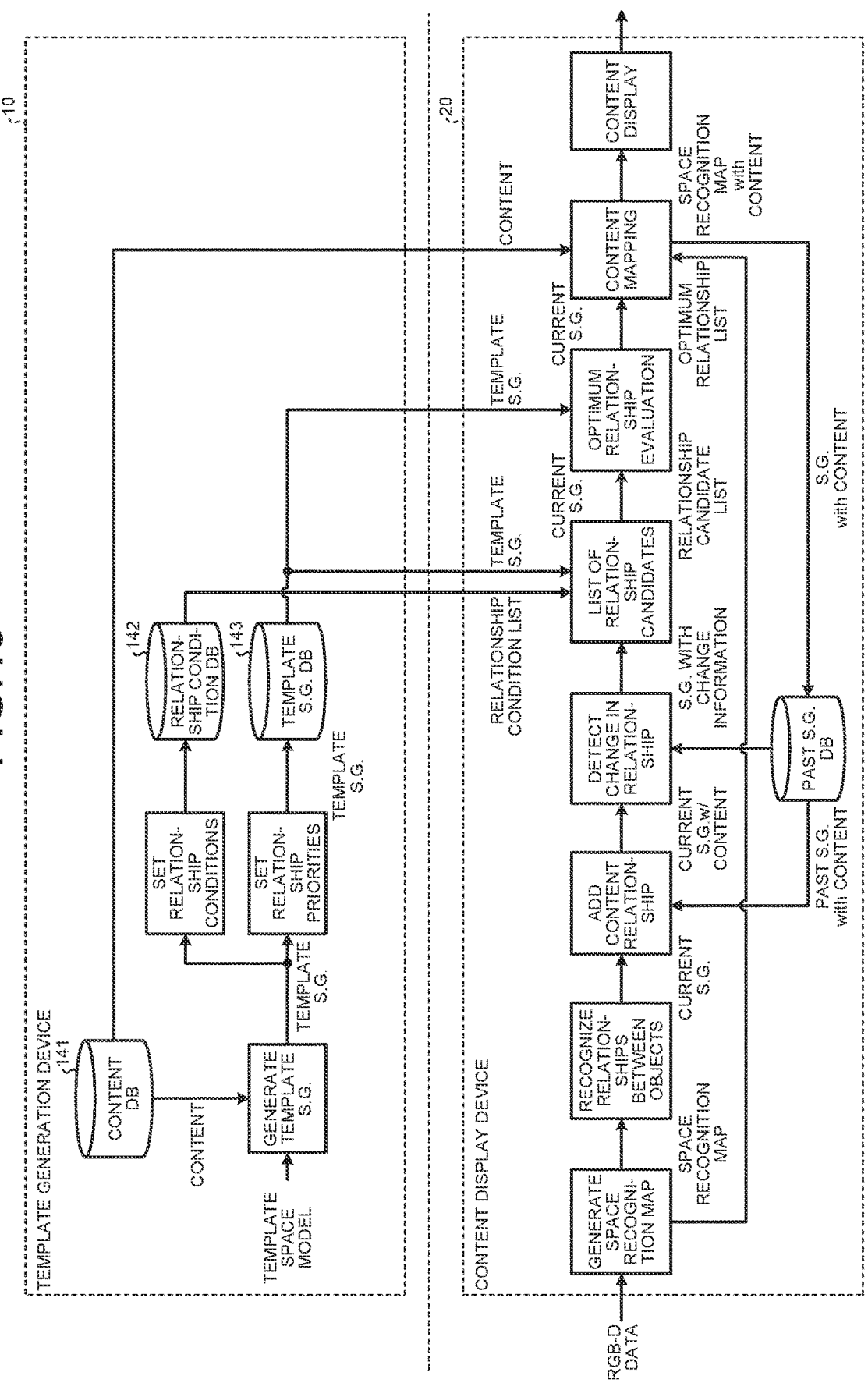
FIG. 19 is a diagram illustrating relationships between functions of the template creation device and the content display device.

Relationships between each function of the template creation device 10 and the content display device 20 that constitute the information processing system 1 will be described using FIG. 19. FIG. 19 is a diagram illustrating relationships between functions of the template creation device and the content display device.

As illustrated in FIG. 19, upon acquiring the template space model, the template creation device 10 generates a template S.G. (scene graph) based on AR content which is stored in the content DB 141. In addition, the template creation device 10 sets relationship priorities for the template S.G. (scene graph) and stores the relationship priorities in the template S.G. (scene graph) DB 143. The template creation device 10 also sets relationship conditions for the template S.G. (scene graph) and stores the relationship conditions in the relationship condition DB 142.

Upon acquiring RGB-D data, the content display device 20 creates a three-dimensional space recognition map. After the creation of the three-dimensional space recognition map, the content display device 20 recognizes the relationship between the objects based on the three-dimensional space recognition map, compares the past scene graph with the current scene graph, adds relationships for unused content for which relationships have not yet been set in the scene graph, and detects changes in the relationships between the objects.

The content display device 20 provides, for the AR content pertaining to objects for which the relationship has changed, a change mark indicating that a change has occurred, and lists, in the template scene graph, positional relationship candidates that enable the relationships of each AR content item in the scene graph to be realized, for the changed content that is provided with the change mark and for unused content. The content display device 20 then collates each of the positional relationship candidates with the relationship conditions, extracts the optimum relationship from among the positional relationship candidates, and evaluates the goodness of fit for the extracted optimum relationship.

The content display device 20 performs content mapping based on a scene graph that represents the positional relationship candidate which has the highest goodness of fit, and displays the content.

3. Processing Procedure Example

<3-1. Processing Procedure of Template Creation Device>

Figure 20:
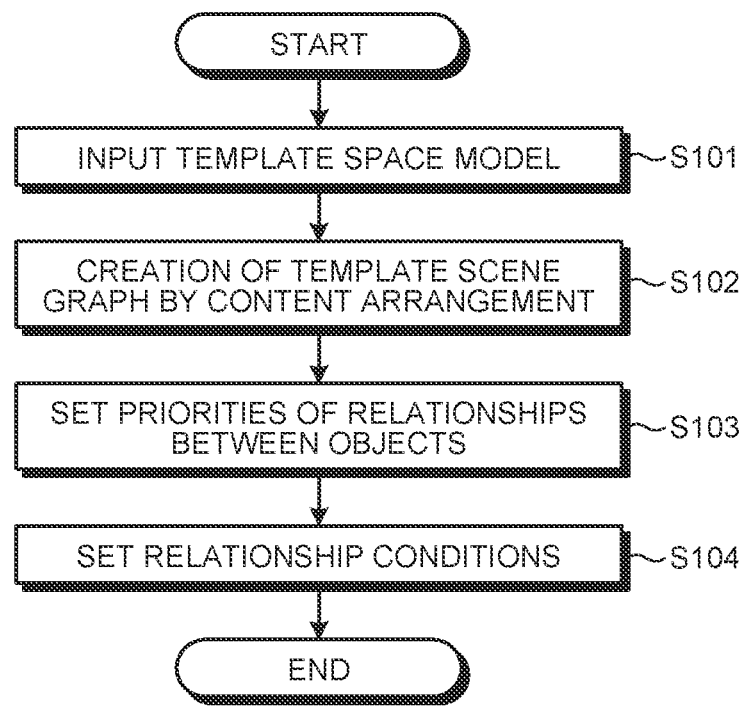
FIG. 20 is a flowchart illustrating an example of a processing procedure of the template creation device.

An example of a processing procedure of the template creation device 10 will be described using FIG. 20. FIG. 20 is a flowchart illustrating an example of a processing procedure of the template creation device.

As illustrated in FIG. 20, the input unit 110 inputs a template space model (step S101). The creation unit 151 executes generation of a template scene graph using content arrangement (step S102).

Subsequently, the setting unit 152 sets the relationship priorities for the template scene graph (step S103), sets the relationship conditions (step S104), and ends the processing illustrated in FIG. 20.

<3-2. Processing Procedure of Content Display Device>

Figure 21:
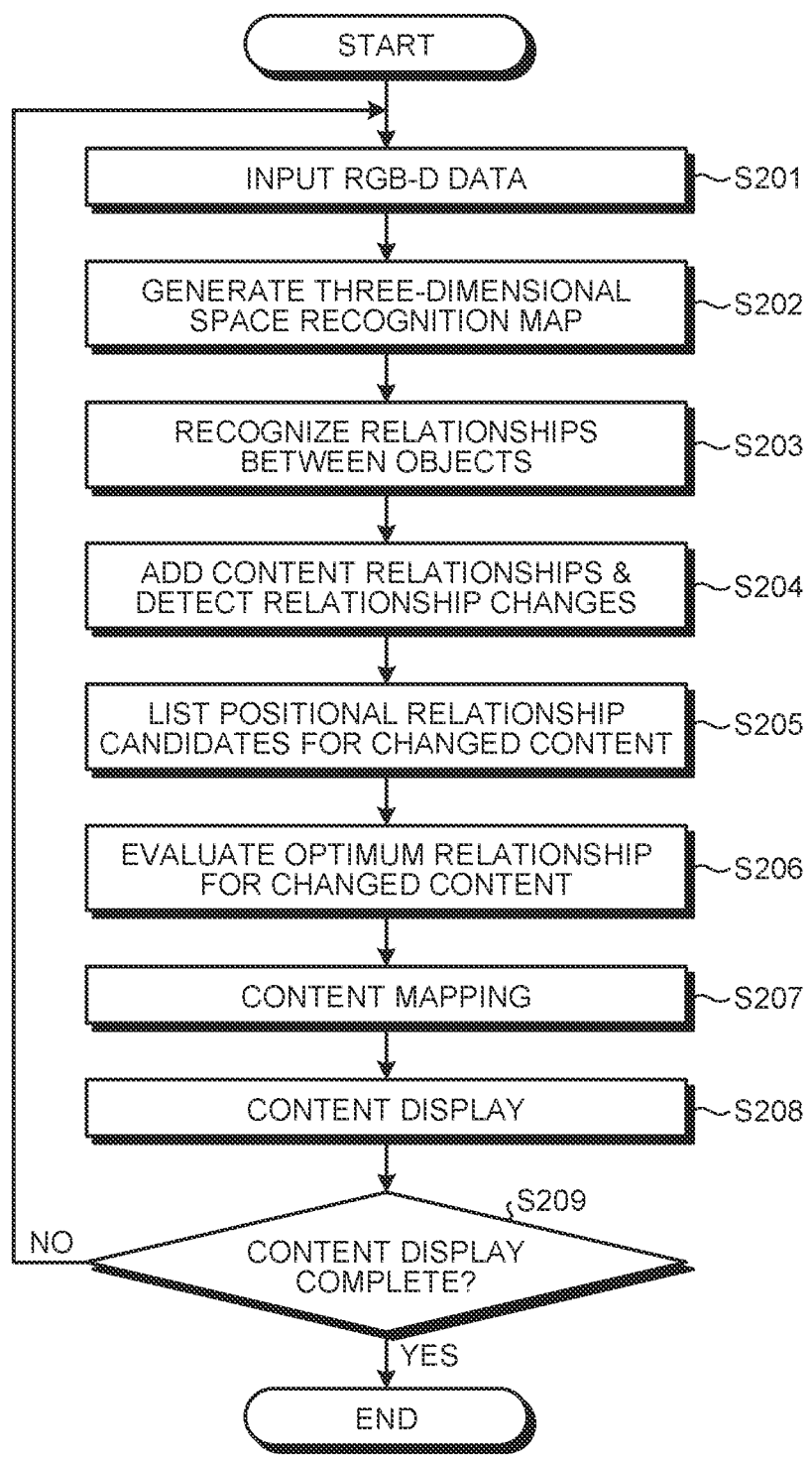
FIG. 21 is a flowchart illustrating an example of a processing procedure of the content display device.
Figure 22:
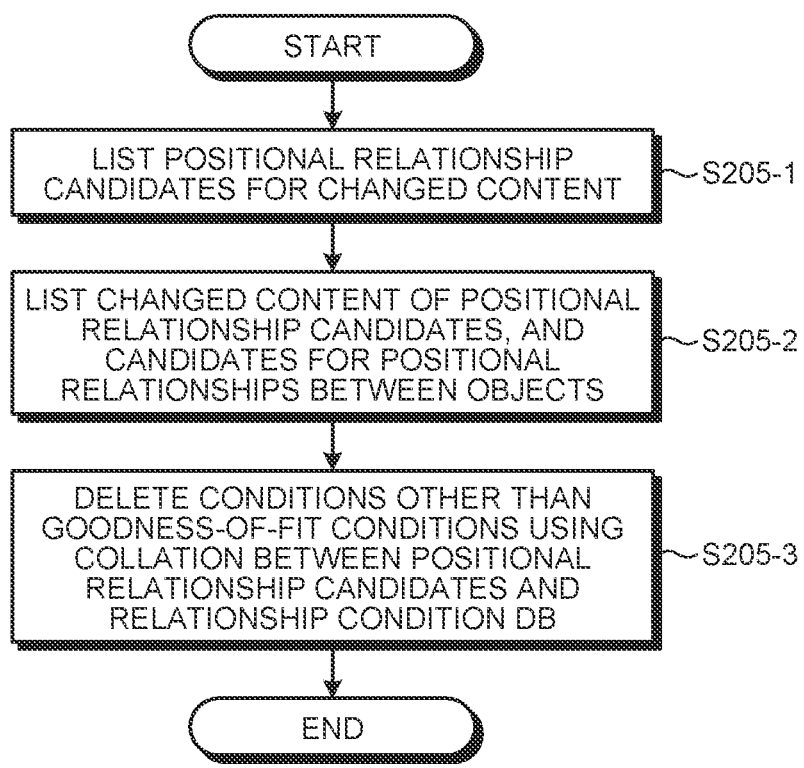
FIG. 22 is a diagram illustrating a detailed procedure for listing positional relationship candidates.

An example of a processing procedure of the content display device 20 will be described using FIGS. 21 and 22. FIG. 21 is a flowchart illustrating an example of a processing procedure of the content display device. FIG. 22 is a diagram illustrating a detailed procedure for listing positional relationship candidates.

As illustrated in FIG. 21, the input unit 210 inputs RGB-D data (step S201). The determination unit 252 generates a three-dimensional space recognition map from the RGB-D data (step S202).

The determination unit 252 recognizes the relationships between the objects based on the three-dimensional space recognition map (see, for example, FIG. 7) (step S203), and generates a scene graph (current scene graph) representing the space in an abstract manner.

The determination unit 252 detects changes in the relationships between the objects due to a temporal change (step S204).

For the changed content, which is AR content for which a change (change in position or the like) has occurred in an object having a relationship with the AR content, the display control unit 253 lists positional relationship candidates that enable the relationships of each AR content item to be realized in the scene graph, using the template scene graph (step S205). Note that unused content which is AR content for which a relationship has not yet been set in the scene graph can be similarly listed in the template scene graph.

The procedure of step S205 will be described in detail using FIG. 22. As illustrated in FIG. 22, the display control unit 253 lists positional relationship candidates for clarifying the positions of the changed content (step S205-1). Subsequently, the display control unit 253 further lists changed content of positional relationship candidates, and candidates for the positional relationships between the objects (step S205-2). The display control unit 253 then collates each positional relationship candidate with the relationship conditions, and deletes conditions other than goodness-of-fit conditions (positional relationship candidates not satisfying the relationship conditions) from among the positional relationship candidates (step S205-3). That is, the display control unit 253 extracts valid positional relationship candidates from among the positional relationship candidates.

Returning to FIG. 21, the display control unit 253 executes the optimum relationship evaluation of the changed content (step S206). That is, the display control unit 253 compares the goodness of fit of the positional relationship candidates for the changed content, and determines the optimum relationship.

The display control unit 253 executes content mapping based on the optimum relationship determined in step S206 (step S207), and performs content display (step S208).

4. Others

In the foregoing embodiments, the content display device 20 may also only execute various processing relating to the experiential phase of the AR content and may transmit the video data of the AR content to a wearable terminal (such as an HMD or a smartphone) of the user experiencing the AR content.

In this case, the content display device 20 transmits the video data of the AR content to a transmission-type HMD, for example, via the network. Thus, the user wearing the HMD can see a state in which the foreground of the user and the virtual object are superimposed through the HMD. The projection method of the HMD is not particularly limited, and may be an arbitrary projection method such as a virtual image projection method or a virtual image projection method.

The content display device 20 transmits the video data of the AR content to a video through-type HMD via the network. As a result, the user wearing the HMD can see a state in which the image captured by the HMD and the virtual object are superimposed on the display provided to the HMD.

Furthermore, the content display device 20 transmits the video data of the AR content to a smartphone via the network. Thus, the user carrying the smartphone can see a state in which the image captured by the smartphone and the virtual object are superimposed on the display provided to the smartphone.

Note that, in the information processing system 1, a projector, a tablet terminal, a television receiver, or the like, may be used as a display device for displaying video data of AR content.

In addition, the content display device 20 according to the foregoing embodiment may be realized by a dedicated computer system, or may be realized by a general-purpose computer system.

Further, a program for executing the operation of the content display device 20 according to the foregoing embodiment may be stored and distributed in a computer-readable recording medium such as an optical disk, a semiconductor memory, a magnetic tape, or a flexible disk. For example, a control device is configured that installs the program on a computer, runs the program to execute the operation of the content display device 20, and executes various processing relating to the experiential phase of the AR content. At such time, the control device may be the content display device 20 according to the embodiment.

In addition, the program may be stored in a disk device included in a server device on a network such as the Internet so as to be downloadable to a computer. Furthermore, functions for executing various processing relating to the experiential phase of the AR content may be realized through cooperation between an operating system (OS) and application software. In this case, a portion other than the OS may be stored on a medium and distributed, or a portion other than the OS may be stored on a server device so as to be downloadable to a computer.

Further, among the respective processing described in the foregoing embodiments, all or part of the processing described as being automatically performed may also be performed manually, or all or part of the processing described as being manually performed may also be performed automatically using a well-known method. Additionally, information that includes the processing procedures described in the foregoing documents and drawings, as well as specific names and various data and parameters, can be optionally changed except where special mention is made. For example, the various information illustrated in the drawings is not limited to or by the illustrated information.

Furthermore, various constituent elements of the respective devices illustrated are functionally conceptual and are not necessarily physically configured as per the drawings. That is, specific embodiments, for distribution and integration, of each device are not limited to the illustrated embodiments, and all or some of such device embodiments can be functionally or physically distributed and integrated in arbitrary units according to various loads, usage conditions, and the like.

In addition, the foregoing embodiments can be appropriately combined to the extent that there is no conflict with the processing content. Furthermore, the order of each step illustrated in the sequence diagram or the flowchart of the present embodiment can be changed as appropriate.

Note that the technology providing AR content that is realized by the content display device 20 according to the embodiment can be applied to any industrial field such as industrial design, medical care, and entertainment in which XR technology such as AR or VR technology is used.

5. Conclusion

As described hereinabove, according to an embodiment of the present disclosure, the content display device 20 (an example of an information processing device) includes the acquisition unit 251, the determination unit 252, and the display control unit 253. The acquisition unit 251 acquires template data defining relative relationships between a first real object, a second real object, and a virtual object. The determination unit 252 determines the relative relationship between the first real object and the second real object from three-dimensional data of a real space detected by the sensor. The display control unit 253 controls the display device 22 to arrange the virtual object on or near the first real object so as to face the second real object, based on the relative relationships and the template data.

Thus, the content display device 20 is capable of realizing the spatial context of the real space as well as content arrangement that corresponds to changes in the spatial context. In particular, the content display device 20 is capable of realizing appropriate content mapping according to a temporal change in the real space, and of displaying video data of the AR content that has undergone appropriate content mapping.

Furthermore, the relative relationships include relative positional relationships between the first real object, the second real object, and the virtual object, and interactive actions of the virtual object with respect to the first real object and/or the second real object. As a result, more specific content mapping can be realized.

In addition, after arranging the virtual object, the display control unit 253 executes an interactive action of the virtual object with respect to the second real object. Thus, interactive actions based on appropriate content arrangement can be realized.

Furthermore, the interactive actions include sitting on the first real object, holding the first real object, and talking to the second real object. As a result, more natural interactive actions can be realized.

In addition, when the three-dimensional data includes a plurality of first real objects, the display control unit 253 arranges a virtual object on the first real object on which no other real object is arranged, based on the template data. Thus, physically natural content mapping can be realized.

Further, in a case where the three-dimensional data includes a plurality of first real objects, the display control unit 253 arranges a virtual object on one of the plurality of first real objects which is closer to the second real object. Thus, physically natural content mapping can be realized.

In addition, in a case where, in the relative relationship, the distance between the first real object and the second real object is a predetermined distance or more, the display control unit 253 controls the display device not to arrange the virtual object. Thus, physically natural content mapping can be realized.

Further, when the determination unit 252 determines the movement of the first real object, the display control unit 253 rearranges the virtual object on the first real object. As a result, content mapping that tracks changes in the real space can be realized.

In addition, the display control unit 253 rearranges the virtual object on the first real object on condition that a certain time or more has elapsed since the previous interactive action of the virtual object. Thus, it is possible to realize natural content mapping in consideration of the time elapsed from the past to the present.

Further, the display control unit 253 rearranges the virtual object on the first real object on condition that the virtual object can perform a predetermined interactive action with respect to the first real object within a certain time. Thus, it is possible to realize natural content mapping in consideration of the time elapsed from the past to the present.

Furthermore, the display control unit 253 rearranges the virtual object on the first real object on condition that the virtual object has a positional relationship enabling a predetermined interactive action to be executed with respect to the second real object by switching a video content scene that includes the first real object, the second real object, and the virtual object. Thus, it is possible to realize natural content mapping in consideration of the time elapsed from the present to the future.

Further, the template data is scene graph data. As a result, the content mapping processing can be executed using more abstract data while reflecting the intention of the content creator, and the processing load can be reduced.

In addition, the determination unit determines, from the three-dimensional data, a relative relationship between the first real object and the second real object based on scene graph data that represents the real space in an abstract manner. Thus, the processing load can be reduced and high-speed processing can be realized in comparison with a case where content mapping processing is performed using low-order data such as mesh data that is three-dimensional data.

Moreover, the first real object is an object that can be sat on or is an object that can be held, the second real object is a person, and the virtual object is a person character that changes according to a relative relationship. Thus, content mapping that assumes a daily scene can be realized.

Although embodiments of the present disclosure have been described hereinabove, the technical scope of the present disclosure is not limited to or by the foregoing embodiments, rather, various modifications can be made within a scope not departing from the spirit of the present disclosure. Moreover, the constituent elements throughout the different embodiments and modification examples may also be combined as appropriate.

Further, the advantageous effects of each of the embodiments described in the present specification are merely intended to be illustrative and are not limited, and other advantageous effects may also be afforded.

Note that the present disclosure may also adopt the following configurations.

(1)

An information processing device, comprising:
an acquisition unit that acquires template data defining relative relationships between a first real object, a second real object, and a virtual object;
a determination unit that determines a relative relationship between the first real object and the second real object from three-dimensional data of a real space detected by a sensor; and
a display control unit that controls a display device to arrange the virtual object on or near the first real object so as to face the second real object, based on the relative relationships and the template data.

(2)

The information processing device according to (1),
wherein the relative relationships include relative positional relationships between the first real object, the second real object, and the virtual object, and an interactive action of the virtual object with respect to the first real object and/or the second real object.

(3)

The information processing device according to (2),
wherein, after arranging the virtual object, the display control unit executes an interactive action of the virtual object with respect to the second real object.

(4)

The information processing device according to (3),
wherein the interactive action includes sitting on the first real object, holding the first real object, and talking to the second real object.

(5)

The information processing device according to (2),
wherein, when the three-dimensional data includes the plurality of first real objects, the display control unit arranges the virtual object on the first real object on which another real object is not arranged, based on the template data.

(6)

The information processing device according to (2),
wherein, in a case where the three-dimensional data includes the plurality of first real objects, the display control unit arranges the virtual object on one of the plurality of first real objects which is closer to the second real object.

(7)

The information processing device according to (2),
wherein, in a case where, in the relative relationship, the distance between the first real object and the second real object is a predetermined distance or more, the display control unit controls the display device not to arrange the virtual object.

(8)

The information processing device according to (2),
wherein, in a case where the determination unit determines the movement of the first real object, the display control unit rearranges the virtual object on the first real object.

(9)

The information processing device according to (2),
wherein the display control unit rearranges the virtual object on the first real object on condition that a certain time or more has elapsed since the previous interactive action of the virtual object.

(10)
The information processing device according to (2), wherein the display control unit rearranges the virtual object on the first real object on condition that the virtual object performs a predetermined interactive action with respect to the first real object within a certain time.

(11)
The information processing device according to (2), wherein the display control unit rearranges the virtual object on the first real object on condition that the virtual object has a positional relationship enabling a predetermined interactive action to be executed with respect to the second real object by switching a video content scene that includes the first real object, the second real object, and the virtual object.

(12)
The information processing device according to (1), wherein the template data is scene graph data.

(13)
The information processing device according to (1), wherein the determination unit determines, from the three-dimensional data, the relative relationship between the first real object and the second real object based on scene graph data that represents the real space in an abstract manner.

(14)
The information processing device according to (1), wherein the first real object is an object for seating or an object that can be held, the second real object is a person, and the virtual object is a person character that changes according to the relative relationship.

(15)
An information processing method comprising:
acquiring template data defining relative relationships between a first real object, a second real object, and a virtual object;
determining a relative relationship between the first real object and the second real object from three-dimensional data of a real space detected by a sensor; and
controlling a display device to arrange the virtual object on or near the first real object so as to face the second real object, based on the relative relationships and the template data.

REFERENCE SIGNS LIST

1 INFORMATION PROCESSING SYSTEM
2 RGB-D SENSOR
10 TEMPLATE CREATION DEVICE
20 CONTENT DISPLAY DEVICE
110 INPUT UNIT
120 OUTPUT UNIT
130 COMMUNICATION UNIT
140 STORAGE UNIT
150 CONTROL UNIT
210 INPUT UNIT
220 OUTPUT UNIT
230 COMMUNICATION UNIT
240 STORAGE UNIT
250 CONTROL UNIT

The invention claimed is:

1. An information processing device, comprising:
a processor configured to:
acquire template data defining relative relationships between a first real object, a second real object, and a virtual object, wherein the relative relationships include relative positional relationships between the first real object, the second real object, and the virtual object, and a first interactive action of the virtual object with respect to the first real object;
determine a relative relationship between the first real object and the second real object from three-dimensional data of a real space detected by a sensor;
control a display device to arrange the virtual object on or near the first real object and facing the second real object, based on the relative relationships and the template data; and
control the display device not to arrange the virtual object based on a determination that, in the relative relationship, a distance between the first real object and the second real object is at least a specific distance.

2. The information processing device according to claim 1, wherein,
after arranging the virtual object, the processor is further configured to execute a second interactive action of the virtual object with respect to the second real object.

3. The information processing device according to claim 2, wherein the second interactive action includes sitting on the first real object, holding the first real object, and talking to the second real object.

4. The information processing device according to claim 1,
wherein based on a determination that the three-dimensional data includes a plurality of first real objects, the processor is further configured to arrange the virtual object on the first real object on which a third real object is not arranged,
each of the first real object and the third real object are included in the plurality of first real objects, and
the arrangement is based on the template data.

5. The information processing device according to claim 1,
wherein based on a determination that the three-dimensional data includes a plurality of first real objects, the processor is further configured to arrange the virtual object on one of the plurality of first real objects which is closer to the second real object.

6. The information processing device according to claim 1, wherein the processor is further configured to:
determine a movement of the first real object; and
rearrange the virtual object on the first real object.

7. The information processing device according to claim 1,
wherein the processor is further configured to rearrange the virtual object on the first real object based on a determination that at least a certain time has elapsed since the first interactive action of the virtual object.

8. The information processing device according to claim 1,
wherein the processor is further configured to rearrange the virtual object on the first real object based on a determination that the virtual object performs the first interactive action with respect to the first real object within a certain time.

9. The information processing device according to claim 1,
wherein the processor is further configured to rearrange the virtual object on the first real object based on a determination that the virtual object has a positional relationship enabling a specific interactive action which is executed with respect to the second real object by switching a video content scene that includes the first real object, the second real object, and the virtual object.

10. The information processing device according to claim 1, wherein the template data is scene graph data.

11. The information processing device according to claim 1,
wherein the processor is further configured to determine, from the three-dimensional data, the relative relationship between the first real object and the second real object based on scene graph data that represents the real space in an abstract manner.

12. The information processing device according to claim 1,
wherein the first real object is an object for seating or an object that can be held, the second real object is a person, and the virtual object is a person character that changes based on the relative relationship.

13. An information processing method, comprising:
acquiring template data defining relative relationships between a first real object, a second real object, and a virtual object, wherein the relative relationships include relative positional relationships between the first real object, the second real object, and the virtual object, and an interactive action of the virtual object with respect to the first real object or the second real object;
determining a relative relationship between the first real object and the second real object from three-dimensional data of a real space detected by a sensor;
controlling a display device to arrange the virtual object on or near the first real object and facing the second real object, based on the relative relationships and the template data; and
controlling the display device not to arrange the virtual object based on a determination that, in the relative relationship, a distance between the first real object and the second real object is at least a specific distance.

* * * * *